(12) United States Patent
Peruski et al.

(10) Patent No.: US 12,455,985 B2
(45) Date of Patent: Oct. 28, 2025

(54) GENERATING BEHAVIORAL PROFILES

(71) Applicant: Comscore, Inc., Reston, VA (US)

(72) Inventors: Jonathon C. Peruski, Vienna, VA (US); Bonnie E. Harvey, Arlington, VA (US); Xuyao Jiang, Rockville, MD (US); Frank E. Pecjak, Kirkland, WA (US)

(73) Assignee: Comscore, Inc., Reston, VA (US)

( * ) Notice: Subject to any disclaimer, the term of this patent is extended or adjusted under 35 U.S.C. 154(b) by 1126 days.

(21) Appl. No.: 17/156,517

(22) Filed: Jan. 22, 2021

(65) Prior Publication Data

US 2021/0232706 A1 Jul. 29, 2021

Related U.S. Application Data

(60) Provisional application No. 62/964,729, filed on Jan. 23, 2020.

(51) Int. Cl.
*G06F 21/62* (2013.01)
*G06N 3/04* (2023.01)
*G06N 3/088* (2023.01)

(52) U.S. Cl.
CPC ...... *G06F 21/6263* (2013.01); *G06F 21/6254* (2013.01); *G06N 3/04* (2013.01); *G06N 3/088* (2013.01)

(58) Field of Classification Search
None
See application file for complete search history.

(56) References Cited

U.S. PATENT DOCUMENTS

| | | | |
|---|---|---|---|
| 2011/0029664 A1* | 2/2011 | Harrang | H04B 17/309 709/224 |
| 2019/0259069 A1* | 8/2019 | Kosai | G06Q 30/0255 |
| 2019/0373297 A1* | 12/2019 | Sarkhel | H04N 21/25841 |
| 2020/0195535 A1* | 6/2020 | Smith | H04L 43/062 |
| 2021/0042357 A1* | 2/2021 | Wang | G06F 16/9574 |

OTHER PUBLICATIONS

Song, Yingbo, Salvatore J. Stolfo, and Tony Jebara. "Behavior-based network traffic synthesis." In 2011 IEEE International Conference on Technologies for Homeland Security (HST), pp. 338-344. IEEE, 2011. (Year: 2011).*

(Continued)

*Primary Examiner* — Vincent Gonzales
(74) *Attorney, Agent, or Firm* — Blank Rome LLP

(57) ABSTRACT

Online consumption data may be secured by receiving data associated with first online interactions actually performed during a predetermined time period, generating, via a machine learning model for each of a plurality of different personas, data associated with second online interactions that simulate Internet traffic, selecting a plurality of the received data associated with the first online interactions that matches the generated data associated with the second online interactions of one or more of the personas, replacing the generated data associated with the second online interactions of the one or more personas with the selected data, and outputting the one or more personas with the replaced data.

17 Claims, 15 Drawing Sheets

(56) References Cited

OTHER PUBLICATIONS

Li, Szu-Chuang, Bo-Chen Tai, and Yennun Huang. "Evaluating variational autoencoder as a private data release mechanism for tabular data." In 2019 IEEE 24th Pacific Rim International Symposium on Dependable Computing (PRDC), pp. 198-1988. IEEE, 2019. (Year: 2019).*

Xie et al., "Differentially Private Generative Adversarial Network" Conference'18, Aug. 2018, London, UK; Retrieved from https://arxiv.org/abs/1802.06739, submitted on Feb. 19, 2018, 9 pages.

Makhzani, et al., "Adversarial Autoencoders" Retrieved from https://arxiv.org/abs/1511.05644, revised on May 25, 2016, 16 pages.

Jaques et al., "Multimodal Autoencoder: A Deep Learning Approach to Filling In Missing Sensor Data and Enabling Better Mood Prediction" IEEE, 2017, 7 pages.

* cited by examiner

GENERATING BEHAVIORAL PROFILES

CROSS-REFERENCE TO RELATED APPLICATIONS

This application claims the benefit of U.S. Provisional Application No. 62/964,729, filed on Jan. 23, 2020, the content of which is incorporated by reference herein in its entirety.

TECHNICAL FIELD

The present disclosure generally relates to generating profiles based on observed behavior.

BACKGROUND

Privacy of digital measurements is a continually increasing concern and a tradeoff now exists between data granularity and privacy requirements. Those interested in the former often demand profile data at the level of individuals' identities. However, regulation to enforce data privacy (e.g., the EU General Data Protection Regulation (GDPR)), protective technologies (e.g., Apple Intelligent Tracking Prevention (ITP)), and incidents of data breaching have led to severe limitations on access and usage of individuals' profiles.

Several measures may be taken to protect privacy. First, the scope of a profile may be limited, which may leave the demand for data granularity unsatisfied. Second, the identity of respondents may be obfuscated by breaking the ties between respondents' identities and their associated profile data. However, such obfuscation to hide individuals' identities is becoming increasingly easy to overcome.

Web browsers have been changing in recent years and more changes are expected with respect to cookies and how user equipment (UEs) allows third parties to access device identifiers (IDs) or IDs for advertisers (IDFAs). For example, there is impending information loss due to legislation restricting permissible attributes or adding consent requirements. Further, there is a tendency for service providers to fragment their data into walled gardens. Therefore, there exists a need for an improved method of anonymously providing behavioral profiles.

SUMMARY

Systems and methods are disclosed for using one or more neural networks to learn behavioral profiles of panelists and then use the neural networks to generate shells or placeholders that represent expected web traffic. These shells or placeholders may then be populated with real event data observed through a census network and/or through tag-less partner integration.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

Figure 1A:
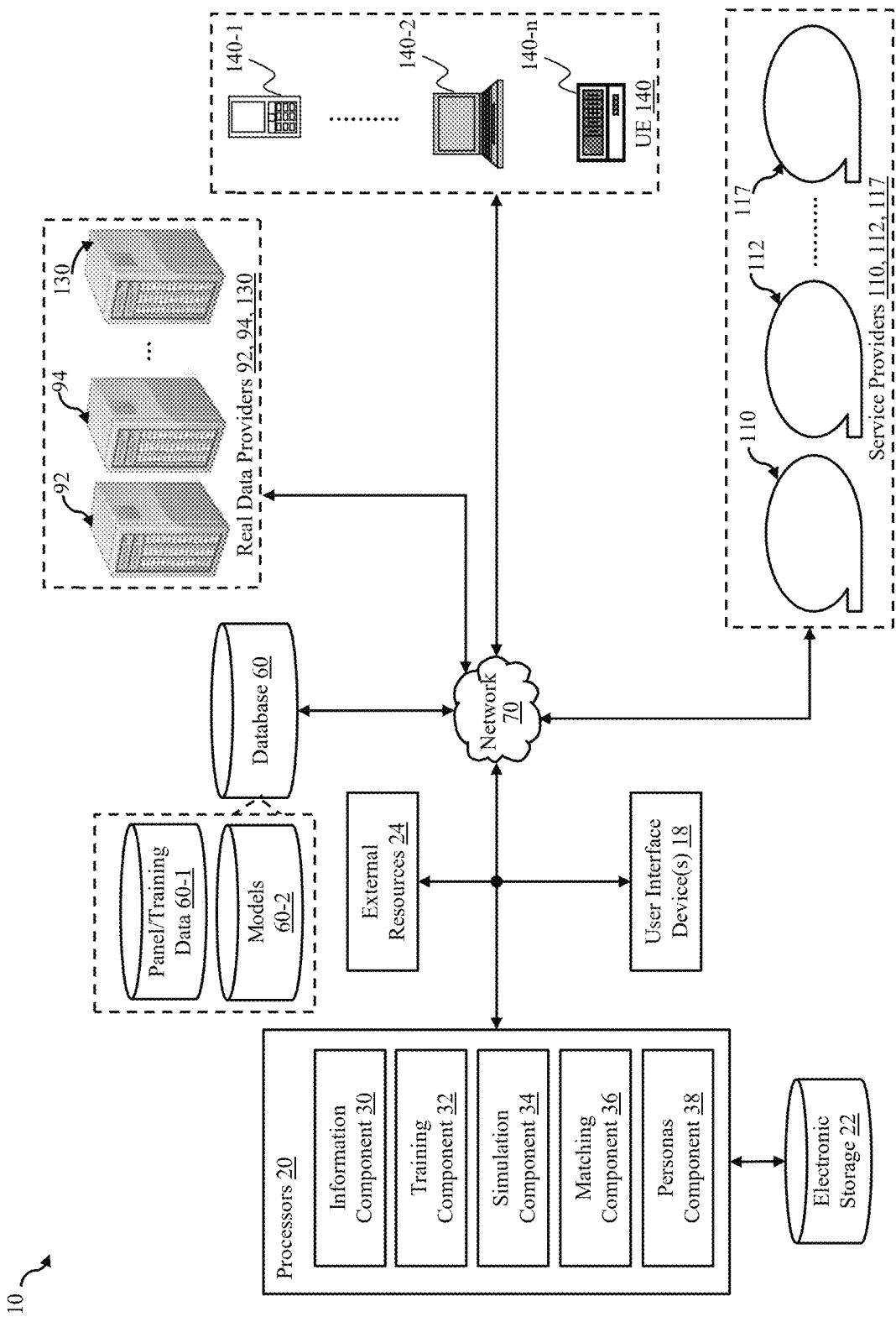
FIG. 1A illustrates an example of a system for securing privacy of online consumption measurements, in accordance with a first embodiment.
Figure 1B:
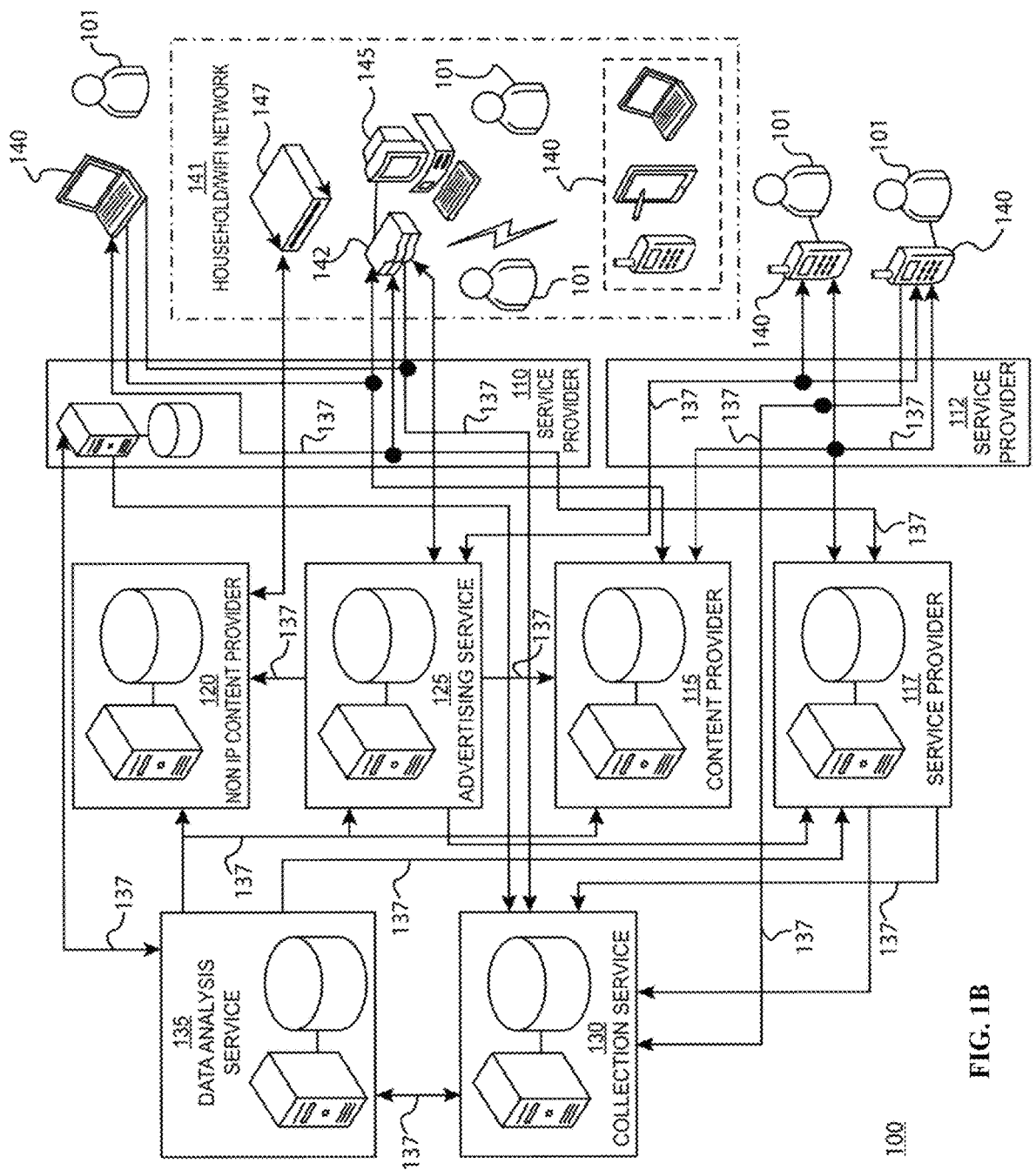
FIG. 1B illustrates an example of a system in which data from multiple sources is collected and analyzed while protecting users' personally identifiable information, in accordance with a second embodiment.

FIG. 1A illustrates system 10 configured to secure data without using persistent IDs. FIG. 1B illustrates another system for aggregating (e.g., clustering) deterministic identities so that measurement data related to the aggregated identity may be subsequently consumed rather than measurement data related to a particular individual. Both are ways of guaranteeing privacy by an extent that satisfies a criterion.

First Embodiment: Securing Data without Persistent Identities

The measurement industry is approaching an inflection point for third-party cross-domain cookies and/or other persistent IDs. For example, some browsers have taken the approach of intelligent tracking prevention (ITP) to restrict non-essential cookies. Disclosed embodiments of system 10 (see, e.g., FIG. 1A) protect internet browsing privacy in view of information quotas and even blanket cross-domain restrictions of cookies. System 10 may nevertheless provide unduplicated digital measurement while protecting digitalized personal information (e.g., without disaggregate data that can be tied back to a personal identifier, including census network users, users of third-party partners, and/or those who agree to being panelists).

In some embodiments, personas component 38 may generate one or more synthetic IDs 98 which break linkage to personal information, while preserving cross-domain relationships and usage intensity. Accordingly, some disclosed embodiments involve generating atomic IDs of a person, device, or another entity in an online session which operate as internal skeletons or templates for populating via extractions in Internet traffic observed from among individual census data 122 (via beacon code), census aggregate traffic 124 (totals), and other census-like, tag-less data 126. Such observation may be in a privacy by design manner as a replacement for use of cookies and device IDs in measurements. System 10 may support information learning and provision on digital audience reach, frequency of interaction, and/or cross-domain association.

Census data and user demographics may be obtained through various processes which monitor or observe user interaction with and access to content. For example, user access to web content may be monitored using a panel-based approach or a beacon-based approach. A panel-based approach generally entails installing a monitoring application on the user devices of a panel of users that have agreed, in advance with informed consent, to have their devices monitored. The monitoring application then collects information about the webpage or other resource accesses and sends that information to a collection server. A beacon-based approach generally involves associating a beacon with the resource being accessed such that a beacon message is generated when a user device renders or otherwise employs the resource. For example, when executed by the user device, the beacon sends a message to a collection server. The beacon message may include certain information, such as an identifier of the resource accessed, a unique identifier associated with the user device, and/or a time of the event.

In some embodiments, simulation component 34 may generate discrete behavioral profiles 88 using adversarial or variational models 60-2. In these or other embodiments, a generative neural network model may be implemented, e.g., for demographic inference. The use of neural networks is thus contemplated for classification, e.g., via discriminative models having an objective to minimize a number of misclassifications of records. In some embodiments, a generative model may produce synthetic records such that a classifier is unable to distinguish between empirical and synthetic observations. And, in an adversarial setting, the generative and discriminative model objectives may be in conflict, thereby strengthening both models. For example, it may be possible to enforce assumptions about the distribution of input data, the distribution of labels, and create realistic synthetic data using random number generation. Variational models may take a similar approach by penalizing statistical distance from an assumed distribution.

Some implementations of the autoencoder 60-2 may involve supervised training by the training component 32. The modeling process may be supervised or unsupervised. An autoencoder is a type of artificial neural network (ANN) used to learn a representation (encoding) for a set of data, in an unsupervised manner.

In some embodiments, the matching component 36 may efficiently sample actual data for creating inputs for the generative model or empty personas 88. This component may select a set of profiles that matches the census distribution. With a naïve input generation process, the distribution of the generative profiles may be inconsistent with a volume and distribution of data 122, 124, 126 observed in census network 92, 94, 130, which may result in constraining the traffic assignment. As used herein, a synthetic persona or profile may represent behavior of online interactions by a set or micro-segment of panelists. For example, models 60-2 may learn how panelists navigate the Internet across sites, including a degree of intensity at which they use these sites.

Some embodiments of system 10 may adapt simplex or another behavior matching solution to assign event level data to unpopulated synthetic profiles 88 on a periodic (e.g., hourly, daily, or at another suitable interval) basis in a manner that guarantees populated synthetic IDs 98 do not represent a real person or ID such that the synthetic IDs 98 do not contain more than X % of events associated with a single real person or ID. For example, (i) real individual census data 122 may be assigned via several partitioned sources in groupings, (ii) real aggregate census data 124 may be assigned via Internet activity totals, and/or (iii) real tag-less census data 126 may be assigned via a third-party having a first-party relationship with its users, such as a walled garden or including non-tagged websites. Accordingly different types of events may be actually observed as input data by being collected from census provider 92, tag-less partner 94, and/or another suitable source and provided to system 10 such that real data is assigned or allocated to empty personas 88. Personas 88 may comprise simulated interaction data at a plurality of online properties such as webpages, apps, or another content source by a plurality of users.

In some embodiments, one or more of the atomic IDs 98 may be generated via aggregating event-level input data 122, 124, 126 to a pseudo ID. For example, the actual input data may arrive as an aggregate, without a persistent ID (i.e., deidentified), and/or with a transient identifier. The actual input data may comprise activity data of a single web browsing event or other online content consumption (e.g., streaming media), and/or of an aggregate of such events (e.g., interactions at an application and/or at a browser). Each piece of actual input data 122, 124, 126 may be timestamped and/or labeled with a time range during which respective measurement was made. The data may comprise such activity as dwelling, clicking, touching, hovering over/out, key pressing, mouse wheel panning, scrolling, and/or other event related information. Application of the models 60-2 with matching component 36 enables personas component 38 to generate IDs that break the deterministic linkage between inbound traffic and a deterministic linkage containing or pertaining to personally identifiable information (PII).

In some embodiments, data collections from census provider 92, tag-less partner 94, or another source may be with a transient identifier that disrupts an expected cardinality of data in downstream product models. Some embodiments of system 10 may re-aggregate event or session data to a synthetic identifier space, e.g., consistent with properly identified data while maintaining privacy of an underlying user generating the traffic. For example, these embodiments may not use any census traffic when training models 60-2, the deidentified census data and third-party data feeds being instead fed into a separate behavior matching unit 36.

ANNs are models used in machine learning and may include statistical learning algorithms. ANNs may refer generally to models that have artificial neurons (nodes) forming a network through synaptic interconnections (weights), and acquire problem-solving capability as the strengths of the interconnections are adjusted throughout training. An ANN may be configured to determine a classification (e.g., type of object) based on input content consumption data. ANNs may apply a weight and transform the input data by applying a function. The function may be linear or, more preferably, a nonlinear activation function, such as a logistic sigmoid, Tanh, or rectified linear activation function (ReLU) function. Intermediate outputs of one layer may be used as the input into a next layer. The neural network through repeated transformations learns multiple layers that may be combined into a final layer that makes predictions.

In some embodiments, the learning of models 60-2 may be of reinforcement, supervised, and/or unsupervised type. For example, there may be a model for certain predictions that is learned with one of these types but another model for other predictions may be learned with another of these types.

Models 60-2 may analyze made predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

In some embodiments, training component 32 may implement an algorithm for building and training 104 one or more deep neural networks. In some embodiments, training component 32 may train a deep learning model on training data 60-1 providing even more accuracy, after successful tests with these or other algorithms are performed and after the model is provided a large enough dataset.

A model implementing a neural network may be trained 104 using training data obtained by information component 30 from storage/database 60 of FIG. 1A. Training dataset 60-1 may be split between training, validation, and test sets in any suitable fashion. For example, some embodiments may use about 60% or 80% of the data for training or validation, and the other about 40% or 20% may be used for validation or testing. In another example, training component 32 may randomly split the labelled data, the exact ratio of training versus test data varying throughout. When a satisfactory model is found, training component 32 may train it on 95% of the training data and validate it further on the remaining 5%. The validation set may be a subset of the training data, which is kept hidden from the model to test accuracy of the model, or a new dataset to test accuracy of the model.

The training of the neural networks may be performed via several iterations. For each training iteration, a classification prediction (e.g., output of a layer) of the neural network(s) may be determined and compared to the corresponding, known classification. As such, the neural network is configured to receive at least a portion of the training data as an input feature space. Once trained, the model(s) may be stored and then used to simulate traffic.

In some embodiments, information component 30 is configured to obtain training data 60-1, e.g., from electronic storage 22, external resources 24, and/or via user interface device(s) 18. In these or other embodiments, information component 30 is connected to network 70 for obtaining training data. Training data 60-1 may be obtained from panelists which have a panel application on their machines that detects that the user has been exposed to certain content and forwards information related to this exposure to processors 20.

Figure 3:
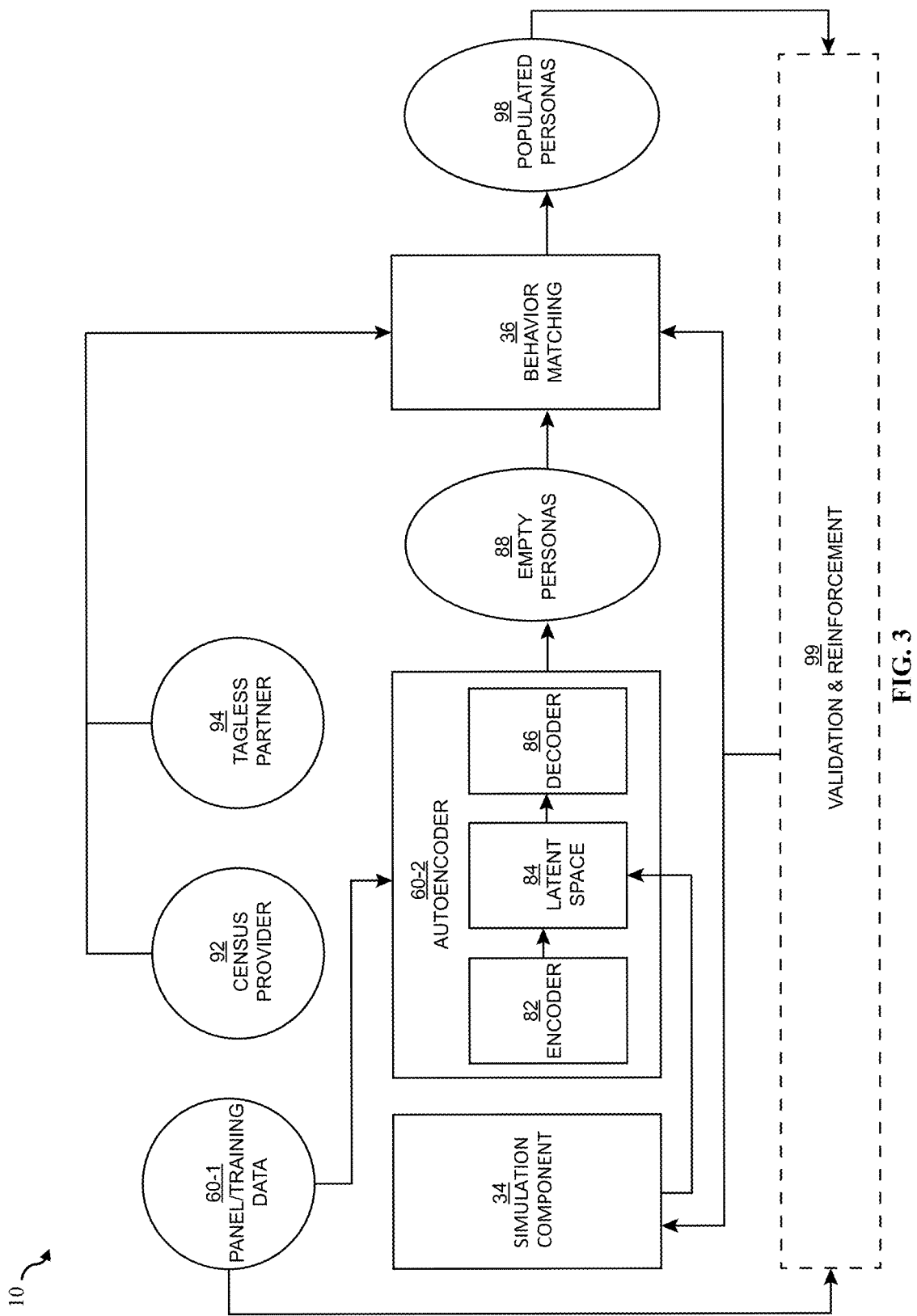
FIG. 3 illustrates an example of a system for training a neural network to synthesize and populate personas, in accordance with the first embodiment.

Disclosed embodiments of system 10 may create, via models 60-2, empty personas 88, as depicted in FIG. 3. These personas may be used for synthesizing panelists. For example, matching component 36 and personas components 38 may take actual events 122, 124, 126 and populate them into empty personas 88. Outputs of this process depicted in FIGS. 3 and 5-6 may be synthetic panelist profiles 98.

In some embodiments, census/real data 122, 124, 126 may be obtained without a cookie or a persistent device ID space. For example, census data may be event-level data from UEs 140. Event-level or interaction data 122, 124 at tagged online properties may be aggregated by a pattern ID or a web ID into a semi-persistent identifier. This pattern ID may be a collection of uniform resource locators (URLs), and it may be based on an internal dictionary structure that could be generalized to a website, an app, or a specific digital video. Other attributes that may be carried forward include operating system (OS) and device type (e.g., Apple tablet, PC, Android phone, etc.). And this actual data 122, 124 may be of actual online interactions which may be observed in a predetermined time period during which the traffic of panel data 60-1 of the panelists is measured.

Tag-less data 126 may be event-level or aggregate data provided by third-party partners or clients of system 10. Data 126 may be obtained from server logs without using tags. The data 126 may possibly be aggregated by pattern ID or web ID into a semi-persistent identifier, where available, based on the same predetermined time period as panel data 60-1 and other aggregate data 122, 124. As mentioned, the pattern ID may be a collection of URLs, and it may be based on an internal dictionary structure that could be generalized to a website, an app, or a specific digital video. Other attributes provided by the third-party partner may include OS, device type, or another aspect of the observed interactions.

In some embodiments, panel behavior model 60-2 may be an autoencoder. This autoencoder may be a deep neural network that trains 104 encoder network 82 and decoder network 86. Encoder 82 may obtain and reduce, using lossless or lossy compression, the dimension of panel data 60-1. Then, decoder 86 may pseudo-reconstruct this input data using the reduced dimension data of latent space 84, while preserving the variance of the input data. Model 60-2 may thus be used to capture panel behavior and create simulated panel-like personas using one or more random numbers generated by simulation component 34. The simulated output of autoencoder 60-2 may be new traffic that resembles traffic of panelists.

Algorithmically, simulation component 34 may generate the random numbers one at a time, each being an array of the right dimensions and correct statistical or parametric distribution of latent space 84 for effectively all of the personas desired for generation. The number of personas may be based on an amount of available hardware resources.

Panelists that generate traffic 60-1, which serves for training model 60-2, may be selected to represent different types or demographics of users 101 and/or their devices 140. The panelists may be weighted to make it more representative of a universe of users and/or their devices. The neural network 60-2 is trained such that not all of the different possible website interactions need to be learned at the same time. Use of a generative model compensates for a possible lack in regularization. For example, noise or other variants may be added for simulated data, which has not been directly observed. Accordingly, model 60-2 may be operable to predict data that looks like panelist traffic, being effectively drawn from the same probability distribution. The output of this model, though, may not look exactly like any of the data previously observed, if one were to compare the records website by website.

The generated personas may be drawn from the same distribution as underlying panel data 60-1. If the panel sample is small, there will be little variance in the data such that it looks homogeneous. But the disclosed models, rather than projecting panelists into the total, may cause simulations from the underlying distribution of panelists with a small amount of noise added. Accordingly, a look at any one of those records may lead to a conclusion that it is drawn from the same underlying data as the panel. That is, any persona may resemble human web traffic as defined by the statistical distributions of the panelists. And an intention may be to maintain a cardinality of the data set to integrate with existing measurement structures.

Figure 4:
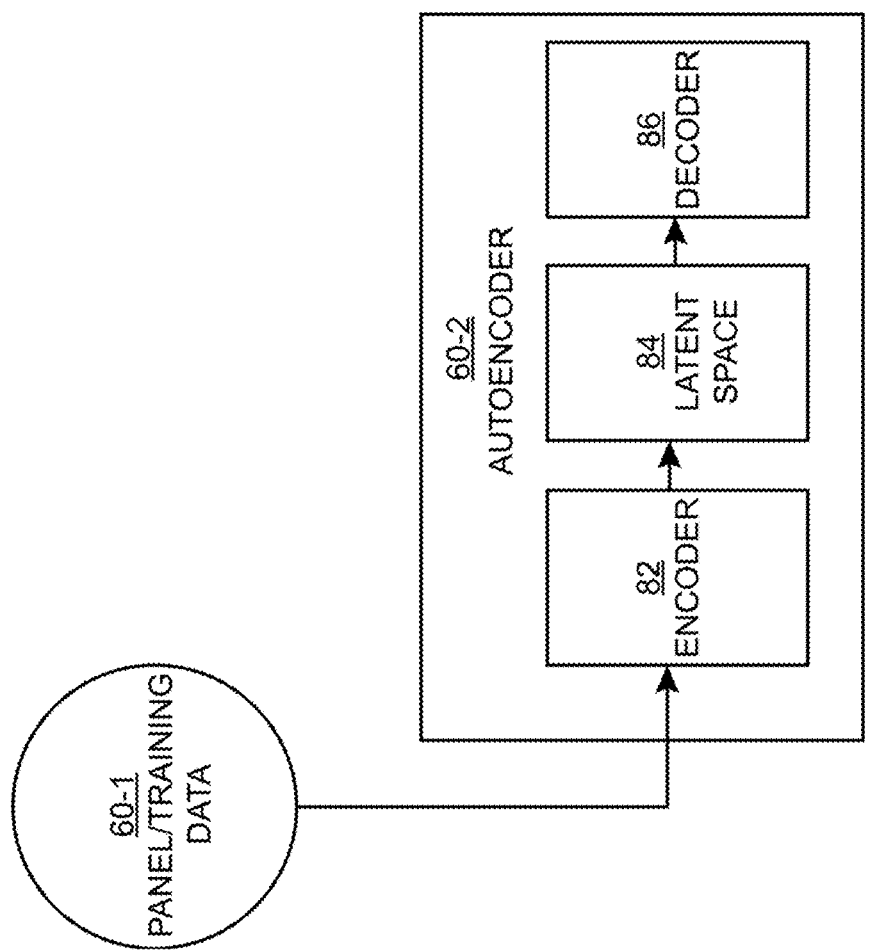
FIG. 4 illustrates an example subsystem for training a neural network using interaction data of panelists, in accordance with the first embodiment.

In some embodiments, model 60-2 may be trained 104, as depicted in FIG. 4. The training may be done at another regular or intermittent interval. Panel data 60-1 may be initially aggregated to by panelist or by their device, for a given time range, with event data organized into input features based off of their web ID or their pattern ID value. Panel data 60-1 may thus be inputted and supplied to autoencoder 60-2, for training of the neural networks. For example, weight matrices of encoder 82 and decoder 86 may be learned using an optimization routine by minimizing the difference in equation 1, below.

$$\text{Input} - \text{Decoder}(\text{Encoder}(\text{Input})) \tag{1}$$

Figure 5:
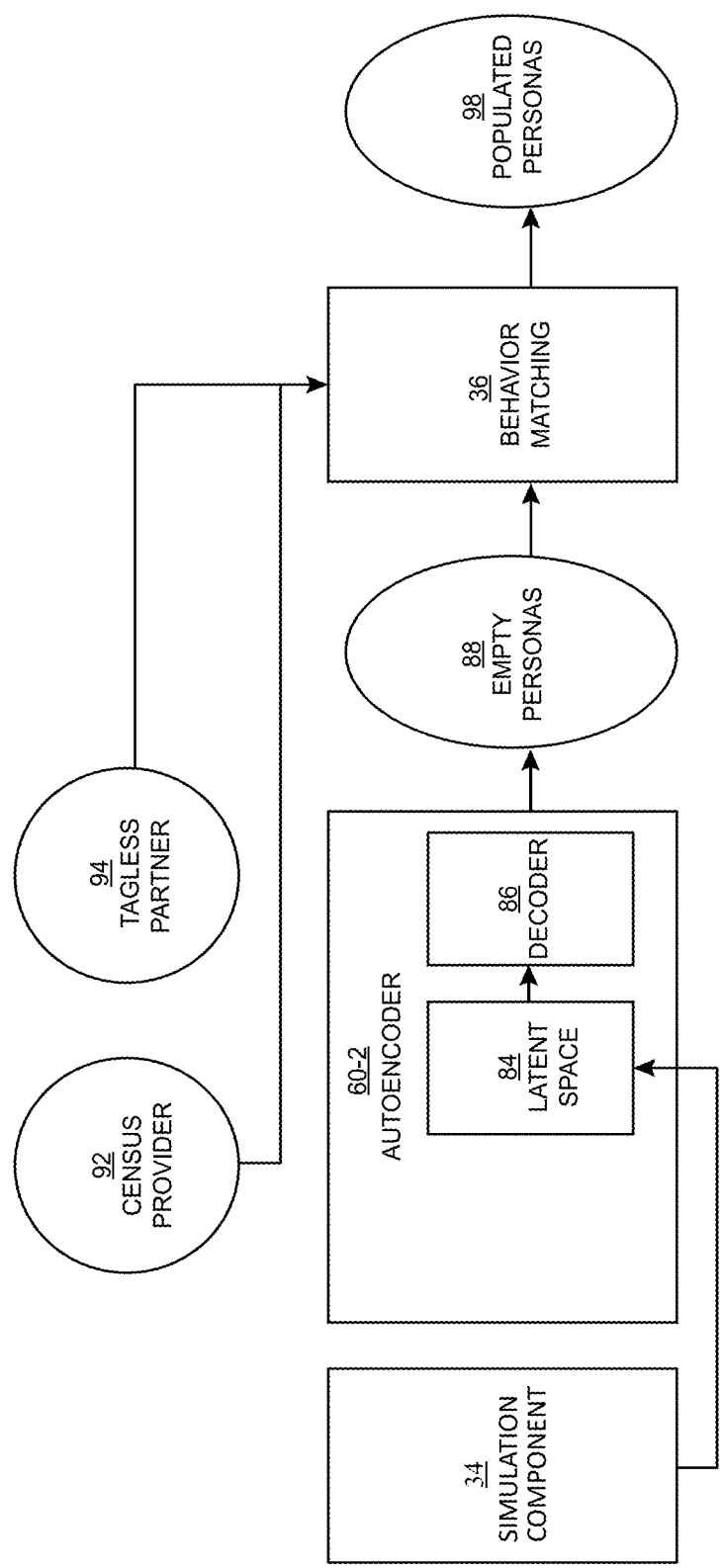
FIG. 5 illustrates an example subsystem comprising a trained neural network deployed to synthesize and populate personas, in accordance with the first embodiment.

FIG. 3 depicts system 10 including optional validation 99 of models 60-2. This model may be optionally trained via reinforcement learning 99, but such functionality may not be a standalone process. As depicted in FIG. 4, panel data 60-1 may be involved in the training of models 60-2 but, as depicted in FIG. 5, panel data 60-1 is not used when the trained model is in deployment.

Figure 7A:
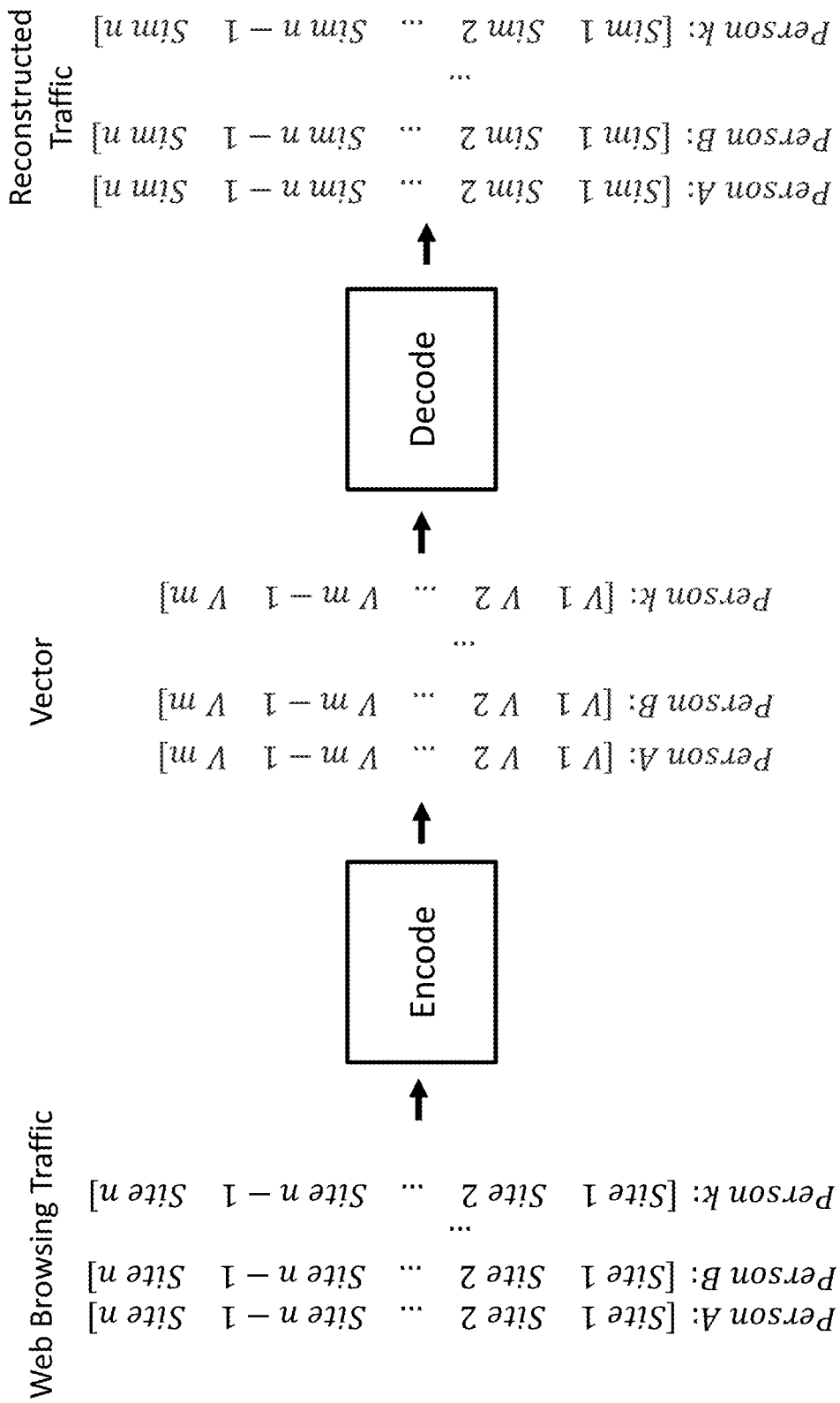
FIG. 7A illustrates an example set of interactions at webpages or websites by a set of panelists that is encoded and decoded (with noise added) to attempt a reconstruction of traffic, in accordance with the first embodiment.
Figure 7B:
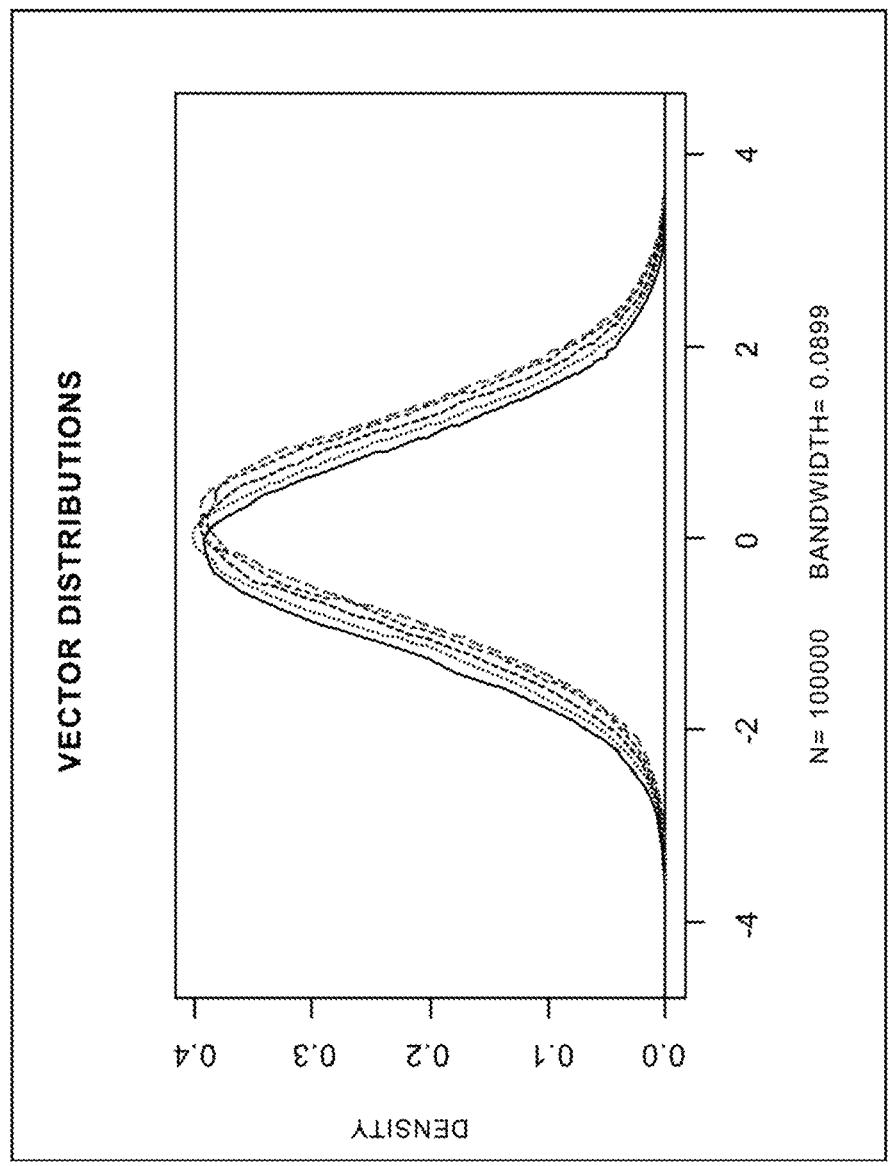
FIG. 7B illustrates statistical density information for understanding that each of the latent space features is drawn from a normal, Gaussian distribution, in accordance with the first embodiment.

In some embodiments, panel data 60-1 may comprise event-level data generated by panelists interacting at both tagged and non-tagged online properties. The panelists may be separated into segments based on a type of device they use. Each panelist may have their traffic aggregated for an observational period by pattern or web ID. For example, panelist A may interact with a first site twenty times, but not interact with a second site during that period. Such web browsing traffic of the panelists is depicted in FIG. 7A. The panel data may be normalized to a consistent scale with outlier events trimmed to a maximum value. Other attributes that may be carried forward include age and gender, OS, and device type.

Autoencoder 60-2 may be a feedforward, non-recurrent neural network having an input layer, an output layer, and one or more connecting hidden layers. This model may be an unsupervised learning model which does not require labeled inputs to enable learning. In some embodiments, autoencoder 60-2 may learn representations of encoder 82 and decoder 86 with respect to a gender, age, or another demographic of the panelist in the input records. Encoder and decoder models 82, 86 may contain a learned representation of the relationship between the different web properties and latent space 84, and between latent space 84 and the original dimension of the data. No individual panelist data, demographics, attributes, or metadata may persist in an output of autoencoder 60-2. For example, this output may be a representation of the entire panel.

In some embodiments, autoencoder 60-2 may take data as input and discover some latent state representation of that data. More specifically, panel data 60-1 may be converted into an encoding vector where each dimension represents some learned attribute about the data. For example, encoder 82 may output a single value for each encoding dimension, or it may describe a range or statistical probability distribution for each latent attribute. Decoder network 86 may then take these values and attempt to recreate the original input. Dimensions may be used herein to denote the number of websites, apps, or videos under measurement. It may essentially be the content that is desired to be measured.

A variational autoencoder (VAE) provides a probabilistic manner for describing an observation in latent space. Encoder model 82 may be referred to as the recognition model, and decoder model 86 may be referred to as the generative model. A VAE is an autoencoder whose encodings distribution is regularized during the training, or whose training is regularized to avoid overfitting and to ensure that the latent space has good properties for generating data. Regularization may improve the generalizability of learned model 60-2 for semi-supervised learning.

Whereas an autoencoder may be deterministic, the VAE may be probabilistic. Although a VAE may be contemplated for model 60-2, other models (e.g., a disentangled variational autoencoder) are contemplated as well. For example, model 60-2 may be adversarial rather than variational. Accordingly, a generative adversarial network (GAN) may be used, but any suitable model that generates data, including an undercomplete model, a sparse autoencoder, a denoising autoencoder, or a contractive autoencoder are contemplated.

Figure 8:
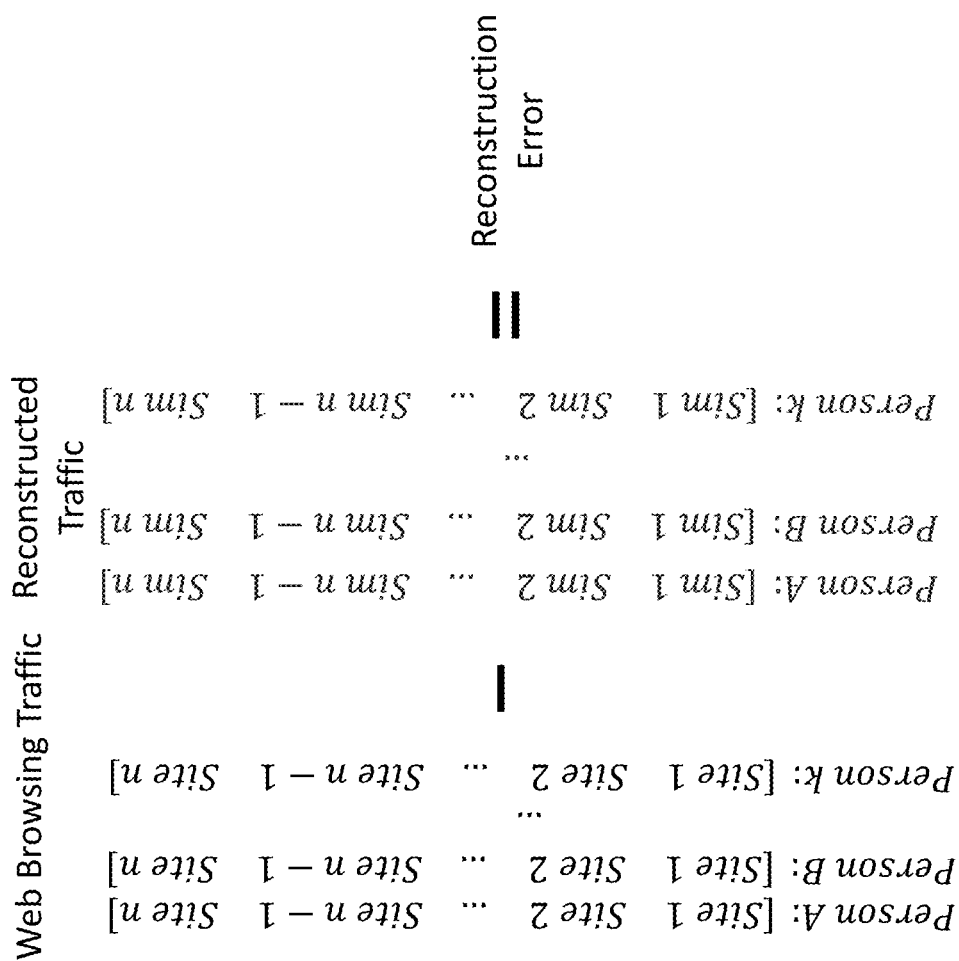
FIG. 8 illustrates an example model training process to minimize reconstruction error, in accordance with the first embodiment.

Autoencoder 60-2 may be a neural network model that takes as input a data array or vector. This model may functionally map this input into a lower dimensional vector representation, and then remap that representation into the original dimensions. Model 60-2 may be optimized to minimize the difference between the input and output data sets such that the lower dimension representation such as the latent space 84 contains as much of the variance as the original information as possible. The training of model 60-2 may thus minimize a reconstruction error between the encoded-decoded data and the initial data. FIG. 8 depicts an example training process used to minimize the reconstruction error.

In some embodiments, a GAN model may be used to automatically discover and learn patterns in input data in such a way that the model can be used to generate or output new examples that plausibly could have been drawn from the original dataset. In an implementation, the generator and discriminator models may be trained together in a zero-sum game which may be adversarial, with the generator network competing against an adversary, discriminator network until the discriminator model is fooled about half the time. In other words, the discriminator may attempt to distinguish between samples drawn from the training data and samples drawn from the generator.

In some embodiments, training component 32 may help facilitate training of a plurality of models 60-2, which are each trained for different personas using separate panel data 60-1. For example, these models may be directed towards learning browsing behavior of a PC browser model, a mobile device browser model, a mobile app model, browsing by a panelist having a certain gender, browsing by a panelist having a certain age, browsing by a panelist living in a certain geographic area, browsing by a panelist having an economic status, and/or another type of characteristic browsing. Different panel data 60-1 may thus be used for training respectively different models 60-2, since the panelists represent a plurality of different ways or types of consuming content.

In some embodiments, encoder 82 may be a model of autoencoder 60-2 responsible for mapping the input data into the lower dimensional space. It may do so by estimating matrices of weights/coefficients that, when multiplied with the input data, map it into the desired dimension. During this process of FIG. 7A, it may be possible to enforce a probability distributions on the output either through "adversarial" or "variational" processes.

In some embodiments, latent space 84 may be a unitless output of encoder 82. Mathematically, this may be a lower dimensional representation of the model input. For example, if 1000 URLs are inputted, they may be represented using, e.g., 15 numerical values. Latent space 84 may contain as much of the information from the input as possible, while requiring far fewer numbers to represent that information, subject to constraints. In some implementations, latent space 84 may be constrained so that it has a Gaussian distribution. Encoder 82 may generate this representation and decoder 86 may map it back into the original dimension (e.g., 1000 URLs down to 15 numbers and then back up to 1000 URLs). For example, tens of thousands of websites may be put into encoder 82 that effectively maps them into latent space 84, which is forced into a certain statistical distribution. Simulation component 34 may then generate random numbers with those dimensions such that decoder 86 decodes them back into the original higher dimension.

In some embodiments, simulation component 34 may initiate implementation of a persona synthesis process by generating random numbers to create a vector of the same dimension and drawn from the same distribution as latent space 84. For example, model 60-2 may generate new data by decoding points that are randomly sampled from the latent space. The quality and relevance of generated data depends on a regularity of latent space 84. In some embodiments, simulation component 34 may cooperate with models 60-2 to simulate an expected entirety of web browsing across a census network. For example, this component may generate random numbers from a known distribution and put these into one of these models to produce empty personas 88. Empty personas 88 may be expectations of how much traffic panelists would have on a number of particular websites or other media at the person level.

Under the foregoing assumptions, simulated latent values may take on values similar to those observed by the panelists, but having no real relationship to any single panelist. When these simulated latent values are supplied to decoder 86, the output may resemble traffic one would expect to observe from panelists. In some embodiments, decoder 86 may be a component model of the autoencoder model or may be a series of component functions of the autoencoder. For example, simulation component 34 may provide random numbers instead of actual data in latent space 84, for subsequent decoding, such that data is seemingly drawn from the panelists without actually being from a panelist due to the data being effectively simulated. Decoder 86 may reverse the transformation applied to the input by encoder 82. Decoder 86 may map latent space 84 back into the original dimension using the same complex mapping function. In other words, model 60-2 may learn how online services are visited by panelists such that this model aggregates how panelists consume traffic. This process is depicted in FIG. 5 with trained model 60-2.

In some embodiments, an output of decoder 86 (e.g., in the model training process) may be a vector of the same dimension as the input, taking on values as close as possible to the input. When generating empty personas 88, the input to decoder 86 may be a randomly generated vector that matches the distribution of latent space 84 learned in the training process. After passing through decoder 86, it may have the same dimension as the input but not be associated with any real event or any real panelist. Conceptually, the output of decoder 86 in deployment may be new data that simulates Internet traffic for a period of time that is mathematically similar to that observed by panelists during training. Disclosed embodiments may thus learn a panelist's behavior and then use a sum of the panelists to predict interactions that look as if they are from the same distribution as the panel.

Figure 10:
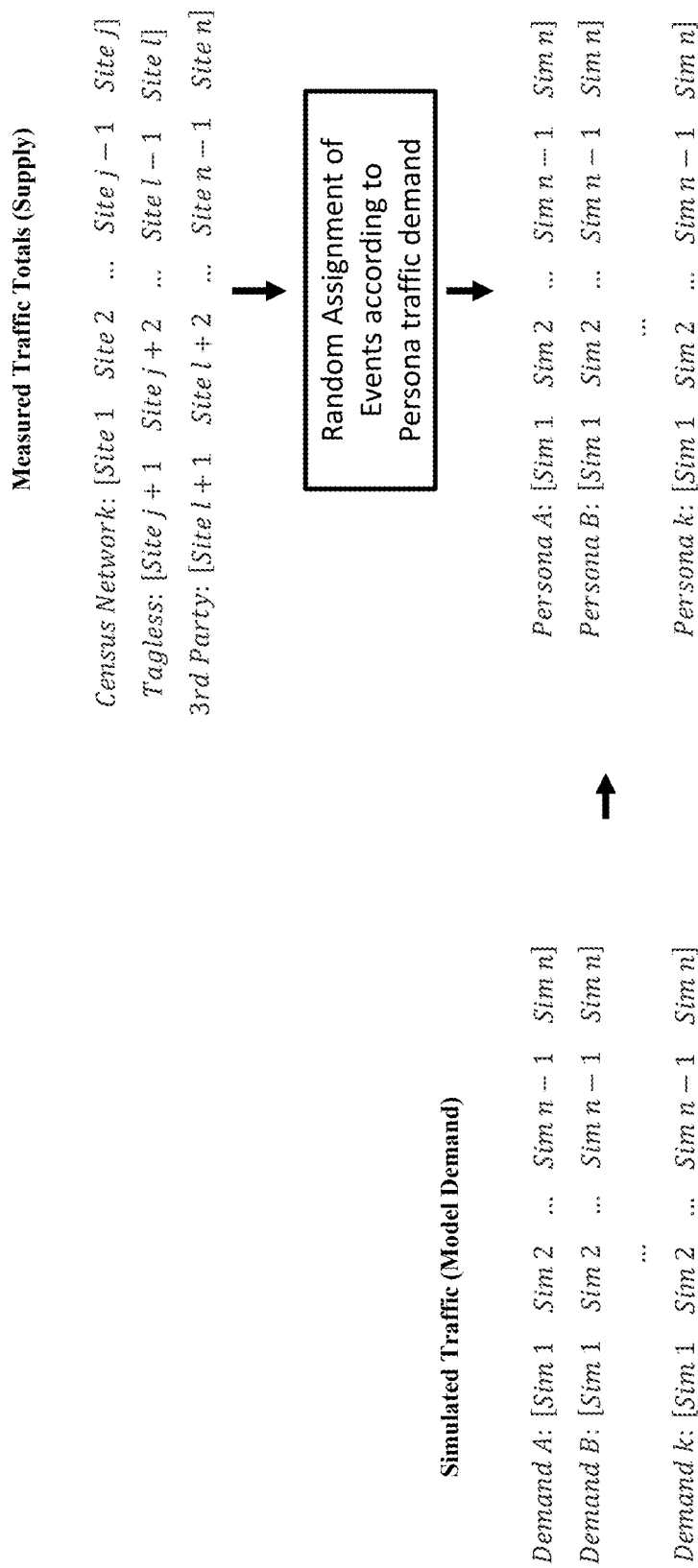
FIG. 10 illustrates a way to take demanded traffic of the panelists and, upon matching with measured traffic, to populate these empty personas, in accordance with the first embodiment.

Empty personas 88 may be generated to match the event totals in census data 122, 124, 126. For example, latent space values may be randomly generated by simulation component 34 according to an expected distribution of total traffic. That is, these values may be decoded to map the simulated latent spaces 84 into the original dimension. And these empty personas with the traffic expectation may be populated with real events through matching or random assignment, as depicted in FIG. 10. Simulated panel-informed behavioral personas 88 may be compared with real, non-identified events. In some embodiments, personas component 38 may take an output of matching component 36 and generate an ID to be associated with real traffic that is behaviorally populated into empty personas 88, as depicted in FIG. 5. For example, an internal ID value may be arbitrarily generated and serve collectively as an atomic ID. Integer programming may be used to select best candidate personas 88 to be used as IDs for disaggregated traffic.

In some embodiments, behavior matching component 36 may implement a process of assigning actual event data from census and tag-less data structures 122, 124, 126 to empty personas 88. If there are semi-persistent or third-party IDs in this event data, then those may be assigned to a most similar persona using a measure of statistical distance. If this event data is ID-less, then it may be randomly assigned to a persona according to the required number of events specified in the empty persona. The process of component 36 may be configured such that any single persona contains no more than X % of events from a single ID and/or is built on one or more IDs.

Figure 9:
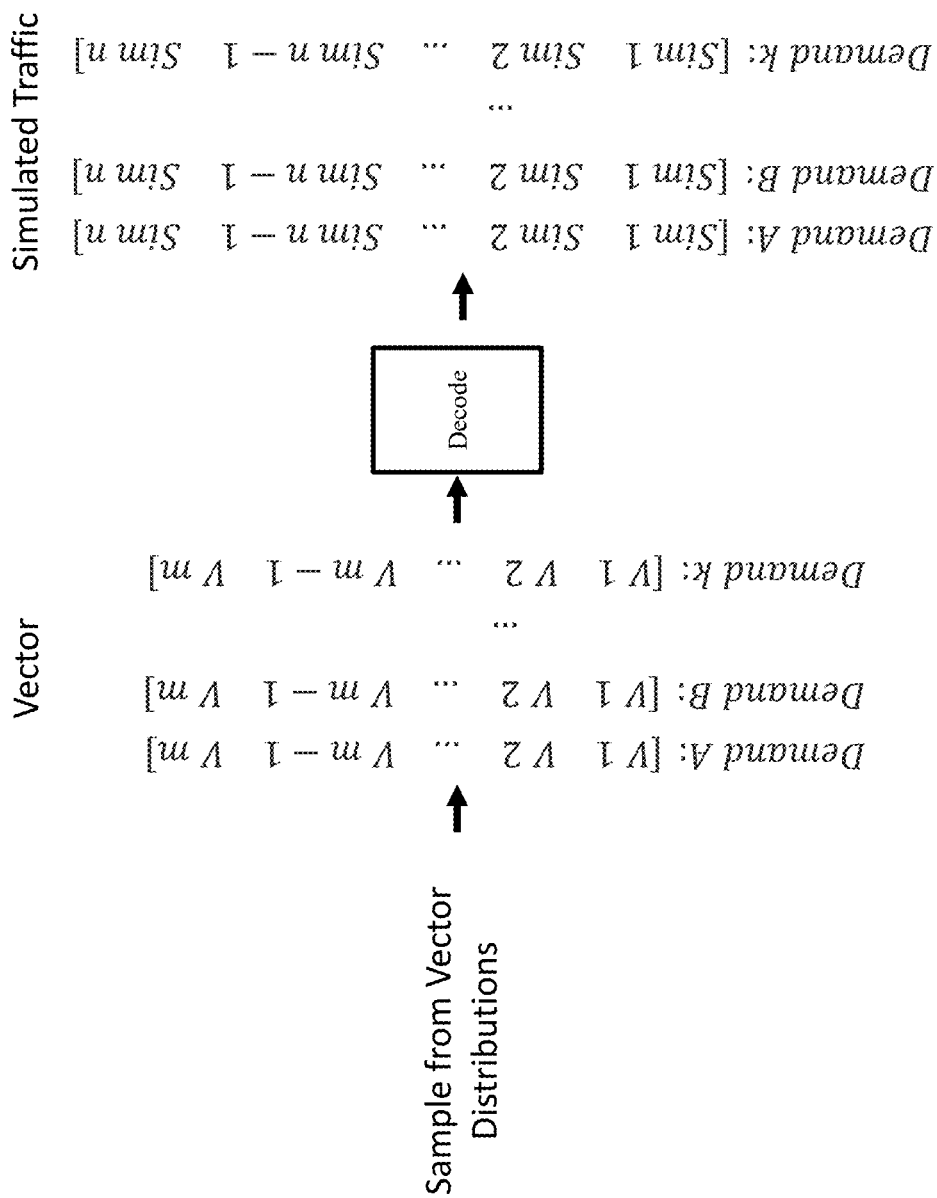
FIG. 9 illustrates an example deployment of a trained model that takes random sample vectors to decode that into simulated traffic for subsequent behavioral matching, in accordance with the first embodiment.

In some embodiments, no panel or personal information may be present upon training model 60-2. That is, in deployment, this model may use random numbers of simulation component 34 that are provided to decoder 86, so that one can assume that they are drawn from the same distribution panel. As depicted in FIG. 9, for example, data is generated through sampling a distribution and via a transformation using decoder 86. Matching component 36 may then behaviorally match traffic into empty personas 88. In the example array of random numbers of FIG. 9, the dimensions may be the number of websites and the number of rows may be the number of personas desired for generation.

"Demand" (i.e., demand A, B, . . . k) in FIG. 9 signifies generated personas. Their decoded traffic may be drawn from the same behavioral distributions as the panelists, but this traffic is purely synthetic. That is, there are no actual events associated the personas until behavior matching 111. In some embodiments, matching component 36 may group traffic together based on an understanding of web browsing behavior. Personas component 38 may next populate synthetic profiles 88 with actual events. Then, the collection of actual events that have been grouped together into synthetic profile 98 may become a new ID space. That is, component 38 may create some sort of arbitrary ID to attach and link all of those events together.

In some embodiments, populated personas 98 may be built based on empty personas 88, which may be a simulation of how the total number of Internet traffic events would be distributed to hypothetical people given learned panelists' behavior. If enough simulated traffic is generated for empty personas 88, then a sum of those simulated events may substantially equal a number of events observed in census network 92 and tag-less data feed 94. Populated personas 98 may thus be empty personas 88 with simulated events replaced with actual events, to offer downstream consumers of this information some assurance that total activity volume is preserved and calibrated by panel(s). In other words, an empty shell which is informed by an autoencoder that is trained off of panel data may be filled with real traffic coming from a census network or a tag-less integration partner. For example, matching component 36 may fill required amounts of census data into the empty personas when a characteristic of the empty persona matches the characteristic of the ID-less census data. When the census data is accompanied with a third-party ID due to that traffic being originated with a user having a first-party relationship with this third-party, component 36 may match the traffic associated with one or more of such IDs into one or more empty profiles 88.

An optimization procedure may be used to minimize an objective function subject to constraints, which can include integer and binary variables to be estimated. In some embodiments, encoder 82 and decoder 86 may be estimated through an optimization routine that seeks to minimize the difference between the actual data input and the output.

Anonymity may be enforced by autoencoder model 60-2 that is a machine-learning model to generate data that decisively represents panel and aggregate data but with an amount of noise added so that it is nearly impossible to recreate the exact panel browsing behavior using the model. Accordingly, the panelists may not be exposed by the model.

Another privacy feature may be performed via the behavior matching of component 36 by filling events in at random by website, URL, or app into profiles 88 to build profiles 98. In some embodiments, personas component 38 may further cluster populated personas 98 either across time or across comparable behavioral profiles to offer further guarantees about privacy and aggregation.

Figure 6:
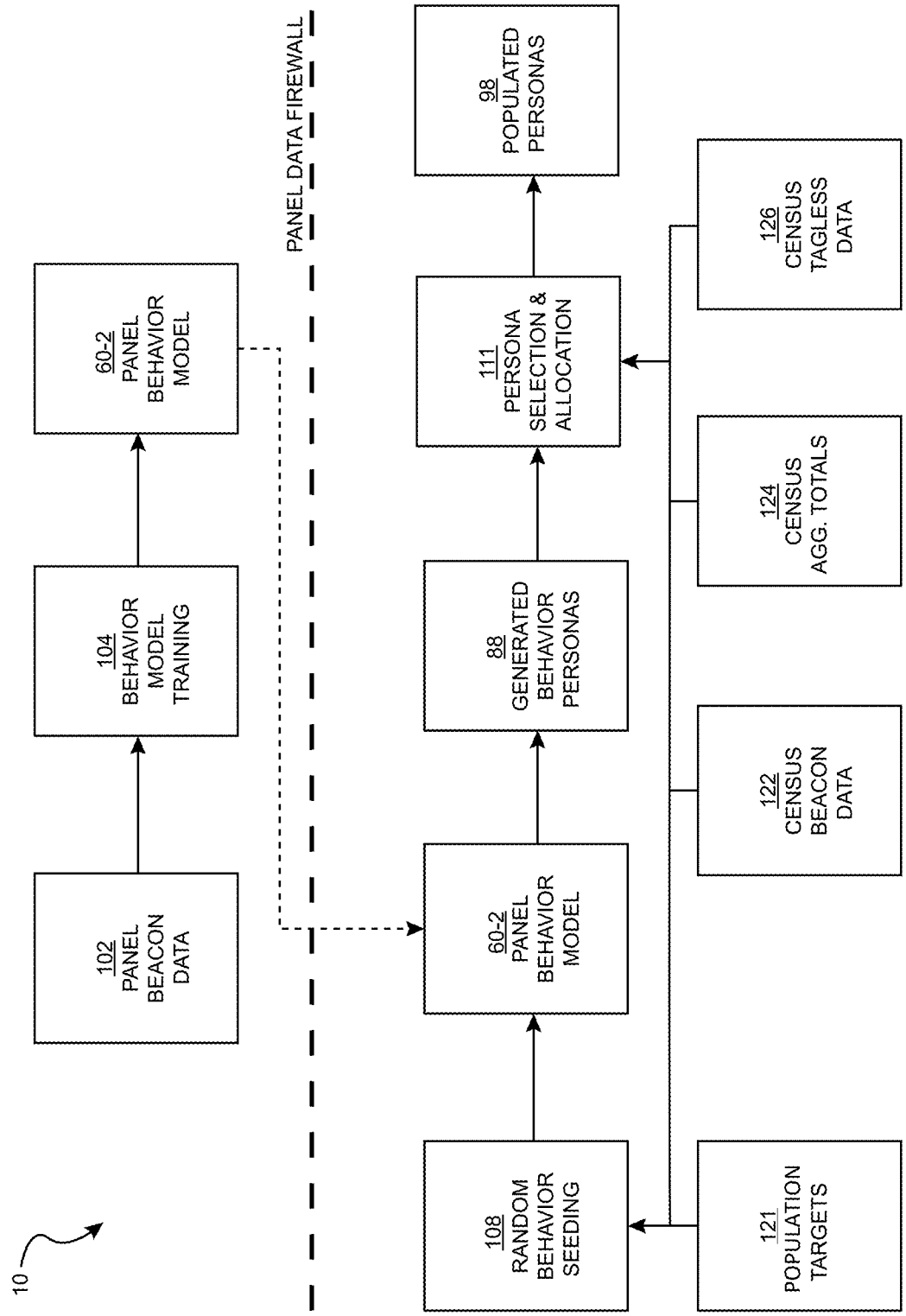
FIG. 6 illustrates an example process of functionality implemented by the structure of FIG. 1A, in accordance with the first embodiment.

FIG. 6 depicts a process that describes aspects of the foregoing operations. For example, population targets 121 may serve as both a random number/behavior seed 108 and for the allocation 111 of real traffic to a persona. For the random behavior seeding, population targets 121 may inform the minimum number of personas needed to generate, e.g., for the day. And, for allocation of traffic, targets coming from the census data assets may be (i) a strict constraint on an optimization procedure to select the best-fit set of personas from a pool of candidate empty personas and (ii) a collection of traffic that needs to be allocated to the selected set of personas.

FIG. 7A depicts training 104 of a model. For example, if panelist A causes interaction data at each of sites 1 to n and panelist B similarly has traffic at these same sites, model 60-2 may learn any relationships and the correlation between the sites through this autoencoder. More particularly, this model may observe how these people visit one of those sites or how they visit two or more of those sites together, etc. The inputs to autoencoder 60-2 may thus be hundreds or thousands of websites, and the encoder may take those sites to map them into a lower, unit-less dimension, e.g., having about five dimensions. The decoder may take those five dimensions and map them back into those hundreds or thousands of websites. When simulation component 34 passes random number vectors from a generative process into latent space 84 through decoder 86, a simulation may effectively be performed for each of those random numbers as to what they signify in the hundreds or thousands of website space. Empty persona 88 may be a simulation of what a device would do on those websites, for a given period of time. For example, site 1 might have 10 page views, site 2 might have no page views, site 3 might four and the like. For each persona 88 that is being generated, it may be representative of a device for a period of time and the amount of web traffic by website that can be expected on that device during that time period.

Figure 13:
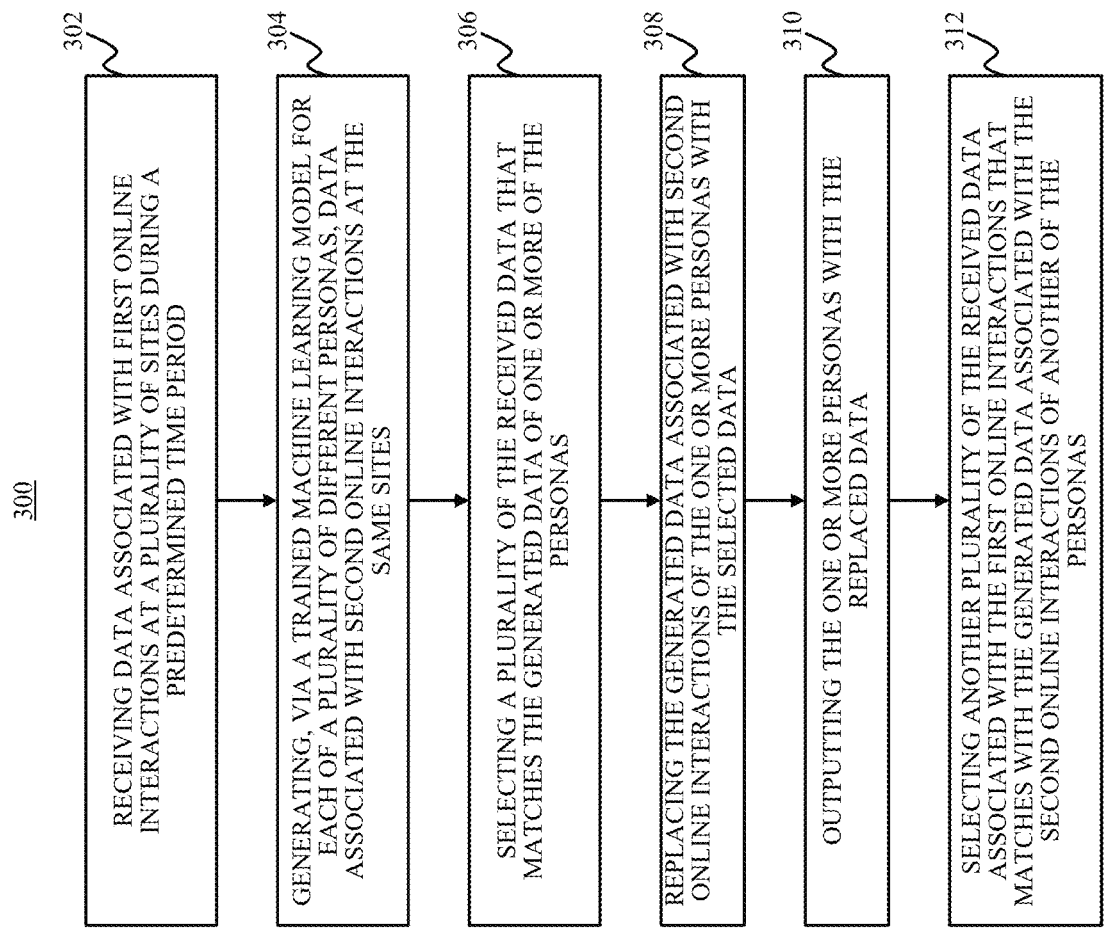
FIG. 13 illustrates a way to behaviorally map interaction data provided at the event level or in aggregate to a synthetic identifier that breaks deterministic ties to personal information, in accordance with the first embodiment.

FIG. 13 illustrates method 300 for training a neural network model to learn and represent panelists' data for securing privacy of online consumption measurements while preserving reach, frequency, and cross-publisher affinity observed by panelists. Method 300 may be performed with a computer system comprising one or more computer processors and/or other components. The processors may execute some or all of the operations of method 300 in response to instructions stored electronically on an electronic storage medium.

At operation 302, data involving first interactions actually performed at a plurality of different online properties during a predetermined time period may be obtained. As an example, traffic may be obtained from the census network without use of cookies where traffic may be comprised of aggregates or individual events at a certain date and time. The data may include the date, time, and potentially some auxiliary information about the underlying device. In some embodiments, operation 302 is performed by the information component 30 illustrated in FIG. 1A.

At operation 304, data involving second interactions at the online properties may be generated, via a trained machine learning model for each of a plurality of different personas. As an example, random numbers may be generated and passed through decoder 86 to synthesize observations from latent space 84, thereby effectively mapping data back into the original web traffic space. As such, a number of personas 88 may be generated such that they represent the totality of a target population by simulated web traffic. In some embodiments, operation 304 is performed by simulation component 34 illustrated in FIG. 1A.

At operation 306, a plurality of the received data which match with the generated data of one or more of the personas may be selected. As an example, an entirely synthetic set of profiles may be informed by the panel as part of training 104 and created to be populated as part of allocation 111 with events that no longer have IDs. In this or another example, there may be a need for twenty real browsing events to fill out or complete that demand. Since persistent IDs may not exist or be obtained from the census traffic, a whole profile may not be matched. Matching component 36 may instead pick random events from the correct collection of website traffic to fill the demand. Component 36 may not match against the whole census but rather against the pool of the census that has a same device type. For example, desktop browsing events may only populate desktop profiles 88, and mobile browsing events may only populate mobile profiles 88. Allocation 111 may be on a website by website basis or on an app by app basis. In some embodiments, operation 306 is performed by matching component 36 illustrated in FIG. 1A.

At operation 308, the generated data of the one or more personas may be replaced with the selected data. As an example, personas 88 may be filled in with traffic of the census network or a tag-less partnership; this actual traffic may represent all of the events in that space, whereas the simulated traffic of personas 88 may represent the interactions between events. In this or another example, actual events may be matched and filled into empty personas 88, resulting in synthetic panelist profiles 98. More particularly, actual events without IDs may be grouped together into these personas. Accordingly, the disclosed approach may involve learning panelist interactions to create profile 88 based on a total for the panelists of a market and then filling those profiles with a sum of actual events for the market. In some embodiments, operation 308 is performed by personas component 38 illustrated in FIG. 1A.

At operation 310, the one or more personas may be outputted with the replaced data. As an example, a database table, which has actual event information, may be outputted. And what is desired to be known may be which events came from the same person or device, but this may not be knowable. The sum of events observed in the generated personas may, e.g., be equal to the sum of all activity events in the census network. To make that equality true, a constrained optimization problem may be implemented. For example, simulation component 34 may generate excess profiles 88 and then use an optimization procedure to select a subset of those profiles that is equal to the total amount of traffic observed in the census network. In some embodiments, operation 310 is performed by personas component 38.

At operation 312 of method 300, another plurality of the obtained data, which behaviorally matches with the generated data of another of the personas, may be selected such that the other persona is outputted with correspondingly replaced data. In some embodiments, operation 312 is performed by matching component 36 and personas component 38.

By the approach of method 300, reliance on third-party cookies may be removed, while delivering trusted measurement solutions that respect the privacy of the underlying users. Disclosed embodiments thus may preserve digital metrics for building the next generation of digital measurement and planning products.

Second Embodiment: Using Cookies to Aggregate Identities

Systems and methods are disclosed for the construction of an aggregation at an atomic level, e.g., atomic identity (AID) clusters. AID clusters may each encapsulate respondents' identities and their characteristically similar data. Each AID cluster may maintain an anonymity level that is determined for protecting the privacy of its encapsulated respondents' identities. Each AID cluster may thus protect the privacy of the underlying identities by maintaining a measure of anonymity that is above a predetermined threshold.

This form of aggregation may be based on directly observable attributes and/or other characteristic or behavioral data. Each AID cluster may, in some embodiments, be refined by further clustering each AID cluster using more attributes or behavioral data until the privacy of information encapsulated in each AID cluster is ensured. That is, each cluster may be comprised of identities and their associated characteristics/attributes; a level of anonymity of the each cluster may then, in certain embodiments, be measured.

If the level of anonymity is determined to be below a predetermined threshold, the corresponding AID cluster may be modified. An AID cluster may be modified by combining it with another AID cluster, by randomizing one or more of its data elements, removed or not reported data elements to an upstream process.

The panel-based information and the beacon-based information may be aggregated and analyzed by a data analysis provider to create important insight into users' behaviors including access and consumption of online content in addition to the effectiveness of advertising. In addition, new user behavior may be continually aggregated to provide continuing analysis of user behavior over time, observe changes in user behavior, and predict future user behavior. Additional insight can be obtained by comparing overall media consumption by a user across many media platforms.

FIG. 1B, shows a system 100 that provides robust data collection and analysis while safeguarding the privacy of the census traffic used for analysis of user behavior. Traditional matching services, which perform analysis, may use the PII of users, such as a name, address, date of birth, or other PII. Typically, datasets that include the PII are sent to third party matching services, which compare the PII of the data sets to return matches based on the PII. In marked contrast, the system of FIG. 1B, provides technology to uniquely identify user content consumption and behavior during a given time period in a privacy-friendly way that does not require sharing PII with the data analysis service or using information that can be used to retroactively identify the actual user who generated the information. As a result, user privacy is protected, businesses are better able to comply with privacy laws and regulations across different jurisdictions, and exposure to potential liabilities is reduced.

In the example shown in FIG. 1B, system 100 may provide for collecting, aggregating, analyzing and reporting user consumption of content across different media delivery platforms while maintaining anonymity of any particular analysis of user information. As shown in FIG. 1B, system 100 includes a plurality of users 101, a service provider 110, a service provider 112, a web content provider 115, an online service provider 117, an offline service provider 120, an advertising service 125, a data collection service 130, and a data analysis service 135. The various components of the system 100 communicate or exchange data via any number of communications paths 137.

Connection or access to various media platforms of system 100 are supplied by service providers 110, 112. Typically, a user has an account with service provider 110, 112 that is associated with one or more of the services. The account may include personal and demographic information about the user and/or their household, such as name, address, age, payment information, and even personal preferences of the user. In addition, the account may have information associated with various user devices for which the service provider provides service. This information may include serial numbers, phone numbers, MAC addresses, network IDs, user agents, and IP addresses among other information that uniquely identify devices associated with a user or household. As a result, the service provider has access to uniquely identifiable information associated with a particular user across various media platforms associated with the user and/or household.

Any typical user 101 of service provider 110, 112 may have a number of associated user devices. For example, a user device may be a consumer electronics device, a mobile phone, a smart phone, a personal data assistant, a digital tablet/pad computer, a hand held/mobile computer, a wearable device, a personal computer, a laptop computer, a notebook computer, a work station, a vehicle computer, a game or entertainment system, a set-top-box or any other device for accessing and presenting various media content and advertising. One set of user devices may be categorized as mobile devices 140, such as a mobile/smart phone, a laptop computer, or a tablet that are able to provide access to content via a mobile network of the service provider 110, 112 (and its subsidiaries and/or partners) at any number of locations were network service is present. In addition, both static and mobile devices of the household 141 may access the service provider 110 through a single point of connection or device, such as a gateway or wireless area network provided by a wireless router 142 associated with a location.

Users employ their devices 140, 145, and 147 to access and consume content, advertising, and services. Data collection service 130 collects and aggregates information and data about user access of, exposure to, and interaction with content and advertising. For example, data collection service 130 may include one or more servers and corresponding data storage configured to receive messages from a user device as the device accesses content. Data collection service 130 aggregates data and periodically supplies the aggregated data to data analysis service 135.

Data analysis service 135 includes one or more servers with corresponding storage that receive the aggregate data, process the data to perform various analyses of the data and generate various reports regarding the data that are useful for providing understanding of audience visitation and habits to support advertising planning, buying, and selling. In one example, information is collected by collection service 130 using a beacon-based approach. The beacon message includes certain information, such as the URL or other identifier of the web content in which the beacon is included. The beacon may provide access to the URL of the web content in which the beacon is included (e.g., via a source attribute). For example, the beacon may cause an HTTP message request (e.g., a GET request, a Post request, or any other standard message type), and the message request includes the URL in a query string to be sent to collection service 130.

A server of collection service 130 records the web content URL received in the beacon message with, for instance, a time stamp of when the beacon message was received, the IP address of the client system from which the beacon message was received, and/or the user-agent of the browser application. Collection service 130 collects or aggregates the recorded information and stores the collected or aggregated information. The collection service 130 also may remove any PII and aggregate the information, store the information, and provide them to the data analysis service 135.

Figure 11:
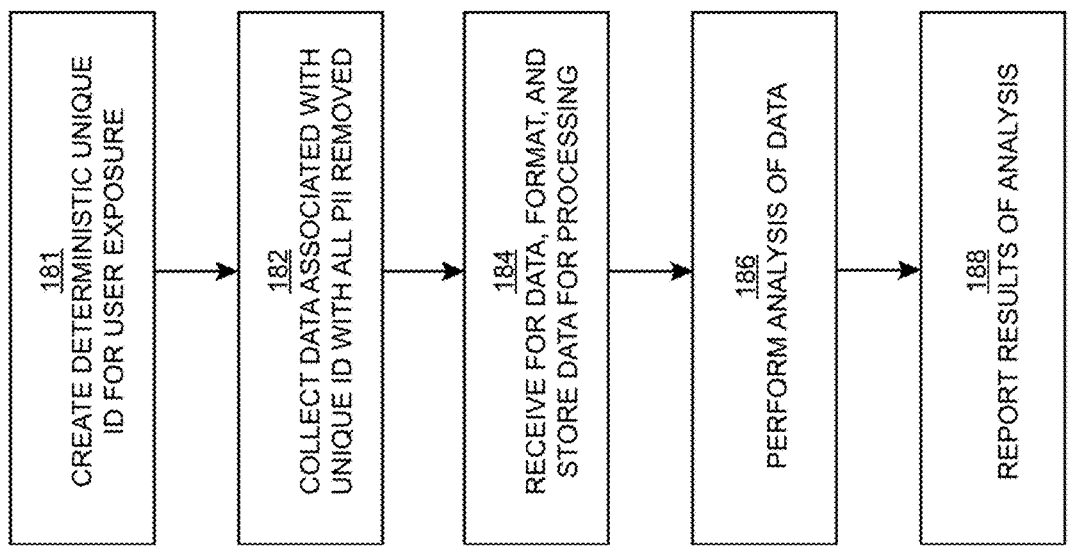
FIG. 11 illustrates a process for collecting content and advertising consumption of users, in accordance with the second embodiment.

In order to address privacy concerns, FIG. 11 shows an example of a process 180 that may be used to collect content and advertising consumption of users during a given time period and to provide accurate and comprehensive analysis of user behavior in a privacy-friendly manner that does not require sharing of PII with the data analysis services or revealing the identity of the underlying individual users during analysis.

At step 181, a unique identifier (ID) is created for association with an exposure to content that does not include any user PII. In one example, a deterministic, one-way function is applied to PII that is included with any request or data collection to create a unique ID. Because the unique ID is deterministic, the unique ID may be used to consistently collect, aggregate, and analyze user behavior attributable to a specific network location or endpoint providing access to a user device consuming the content. However, since the function is one-way, the unique ID may not be reversed to obtain the user's PII or identify. Therefore, the user's identity and PII are protected while allowing meaningful collection and analysis to be performed.

One example of a deterministic, one-way function is a hash function. For example, a typical request, such as an HTTP request sent to collection service 130 may include PII, such as an IP address. In this example, the unique identifier may be generated by creating a hash of the IP address received by the collection service 130 using a cryptographic algorithm, such as a message digest (MD) algorithm. For example, the MD5 message-digest algorithm, a widely used cryptographic hash function, may be used to produce a 128-bit (16-byte) hash value that is used as the unique ID.

In another example, service provider 110, 112, 117 has information, such as an IP address, which may be used to identify their users' point of access/connection during the exposure event to online content or be associated with a household account to track exposure to offline content. The unique ID may be generated from an IP address provided from service provider 110, 112, 117 using a ping, a relay, or a batch process from service provider 110, 112, 117 to the collection service 130. Collection service 130 then determines a unique ID using an IP address provided in the ping, relay, or batch and may remove any PII. The unique ID also may be returned to the service provider in response.

In one example, service providers 110, 112, or 117 may "ping" collection service 130 in real-time (e.g. on exposure to an event) for creation of a unique ID to be associated with the event in the same manner as beacon message. In this example, service provider 110, 112, 117 generates an HTTP request to the collection service 130 with an IP address at the time of access or exposure associated with the IP address.

In another example, a service provider may delay reporting of event exposures or access. For example, a service provider may compile of file of IP addresses associated with access or API call for service of the provider over time period. The service provider then runs the files of IP addresses using an X-Forwarded For parameter to place the IP addresses in the HTTP request header sent to the collection service. This type of reporting to the collection service may be done periodically (e.g., hourly, daily, weekly), at specific times, or on an ad hoc time frame basis.

In yet another example, service provider 110, 112, 117 may use an API or script to generate a request with the PII to the collection service 130, which then uses the deterministic, one-way function to create a unique ID for the PII. This process may be a batch process providing a number of IP addresses at the same time. The collection service 130 determines and returns the unique ID to the requesting service provider 110, 112, 117.

In addition, service provider 110, 112, 117 may provide collection service 130 (via the ping, the relay, or the batch process) obfuscated service provider user IDs in addition to any number of user attributes (e.g. exposed/not-exposed flags, platform indicator, gender, age, etc.) to facilitate intended research. The service provider user IDs can be obfuscated using some alternate-ID or hashing algorithm to prevent the data analysis service 135 from identifying specific users within the data, while maintaining a connection of the users to their IP addresses via association with the deterministic, unique ID. This facilitates analysis of specific users or households by the data analysis service 135, while protecting the individual user's identity when the associated data is beyond control of service provider 110, 112, 117.

For example, service provider 110 may associate the unique ID with data generated in association with offline content by a user and/or household that otherwise would not have an IP address associated with the data (e.g., offline data). For example, a household may be associated with the received unique ID and sent to collection service 130 or directly to data analysis service 135 without providing any PII to data analysis service 135. Associating the unique ID with the offline data allows the offline data to be aggregated and analyzed with the online data.

In another example, the deterministic, one-way function may be provided to various service providers 110, 112, 117. In this example, the service provider can create the deterministic, unique ID and associate the unique ID with any data internally prior to providing the data to the collection service 130 and/or the data analysis service 135. As a result, no PII is provided or used outside service provider 110, 112, 117, providing maximum control of user PII by the service provider.

The following shows one example of the data received by collection service 130:

| Data Received by data Collection Server | | | |
|---|---|---|---|
| ip_address_raw | SP user_id | field1 | timestamp |
| 25.39.144.88 | 1234567890 | 0 | Mar. 6, 2014 18:45 |
| 45.13.130.9 | 2345678901 | 1 | Mar. 7, 2014 15:07 |
| ... | ... | ... | ... |
| 143.30.99.60 | 3456789012 | 1 | Mar. 7, 2014 23:41 |

The following shows one example of data sent to data analysis service 135 with PII removed.

| Data Sent to data Analysis Service | | | | |
|---|---|---|---|---|
| ip_address_hash | collection_id_hash | data_field1 | data_field2 | data_field3 |
| 4b956276fb | b09001ccfb | 1234567890 | 0 | Mar. 6, 2014 18:45 |
| 3rv8he090x | 0aa1334300 | 2345678901 | 1 | Mar. 7, 2014 15:07 |
| ... | ... | ... | ... | ... |
| 9m8n15fjak | c2c608c09e | 3456789012 | 1 | Mar. 7, 2014 23:41 |

These examples are shown to illustrate the creation and association of a unique ID. It will be appreciated that there may be additional data fields not shown as need for any particular application. For example, data fields for URLs, agents, demographics, etc. may be included with the data received and sent from collection service 130.

At step 182, data associated with a unique ID with all the PII removed may be collected at the collection service 130.

At step 184, the data associated with deterministic, unique ID is received and processed by data analysis service 135. In order to protect privacy, a specified set of controls may be placed between collection service 130 and data analysis service 135. For example, data analysis service 135 may not be permitted to access the equipment of collection service 130 and can only download the collected data. In addition, the data can be removed from collection service 130 after it is downloaded by data analysis service 135. The collected data may be automatically downloaded by servers of data analysis service 135 and processed in batches. For example, data analysis service 135 may process a row from the collected data and write a new row of data to a file that is the processed data of record before storing the data for analysis.

At step 186, the processed data may then be aggregated by the deterministic, unique ID and analyzed. By aggregating data by unique ID, unique user or household behavior may be recorded in databases and analyzed over multiple media platforms or content sources where data is anonymous and the privacy of the user PII is maintained. Various types of analysis may be run on the data sets, such as, for example, audience analytics, advertising analytics, web and monetization analytics, and mobile operator analytics. The analysis may be run on the same and different data sets varying the time frame, the geographical area, the network or service provider, the media type or platform, and even be used to predict future behavior and trends. In addition, the data sets may be continuously aggregated and updated. As a result, data analysis is able to capture changing trends and behavior in real time or near real time. Because data is continually aggregated over time, service providers, content providers, and advertisers do not need to service and maintain their own databases.

At step 188, various reports may be generated from the analysis to show and explain behaviors, trends, results or effectiveness of marketing campaigns or influence on use behaviors.

Some embodiments of system 100 may produce event level information with respect to a plurality of different data sources, including those depicted in FIG. 1B. In some embodiments, event level data/information may include data typically stored in a user profile, such as observable activity or interaction with displayed content. System 100 may build a core audience measurement product (e.g., user profile) by tying different data sources together using a common identity or identifier (ID). In some embodiments, inference methods may be utilized. In other embodiments, a deterministic model may be utilized.

Aggregating the identities and their associated data into clusters protects these identities from being uncovered. Thus, data offered in the form of clusters allow for granularity that is at a respondent level, thereby providing recipient entities (or upstream processes) with flexibility in measuring audience behavior based on those clusters. Each of the generated clusters may be a group, cohort, set, or other subset of a larger dataset.

In some embodiments, clusters may be generated linearly and in others the clusters may be formed iteratively. Further, in some embodiments, the generated clusters are "hard," meaning that entities either belong to a cluster or they do not, and in other embodiments the clusters are "soft," meaning that each entity belongs to each cluster to a certain degree. Another dichotomy with respect to clustering approaches contemplated herein is that clustering may be performed hierarchically (e.g., nested) or via partition (e.g., un-nested). In partitional clustering, a set of identities is simply divided into non-overlapping clusters (e.g., subsets) such that each identity is in exactly one cluster.

In some embodiments, the clustering may be performed algorithmically. For example, system 100 may use an algorithm based on a distance-connectivity model (e.g., agglomerative hierarchical or divisive hierarchical), centroid model (e.g., k-means, Bradley-Fayyad-Reina, point assignment, etc.), distribution model, density model, well-separated model, contiguity model, shared-property model (e.g., conceptual), group-based, subspace model, graph-based model, neural model, or prototype model. In embodiments where a hierarchical or k-means clustering algorithm is used, the clustering may be performed by considering different types of distance metrics between entities or between clusters of the dataset.

Some embodiments may encapsulate or otherwise aggregate granular information (e.g., content interaction data or other profile data obtained with respect to a particular person or group) to thus break any relationship(s) with individual data records. Using an aggregating function (e.g., mean, median, mode, etc.), some embodiments of system 100 may generate reporting information similar to granular information previously generated with respect to individual IDs. These or other embodiments may aggregate data by incorporating variance in data with respect to a group of IDs such that no one profile or data source may be reported by itself. Some embodiments may measure information to be reported for an aggregate structure by empirically determining whether the information has a statistically significant likelihood of representing a single person.

Some embodiments may build an aggregate structure to represent a set of digital identities. For example, identities may be collected via, e.g., content tagging, server transfer, and/or other suitable collection means or algorithms. Successful use of the aggregate structure (e.g., representations, assignments, or other operation) may provide an encapsulation layer protecting individual identities and private attributes. The individual identities may include identifiable information, and the private attributes may include information not identified or otherwise allowed for sharing or collection. Some embodiments may thus obtain event data that is sufficiently granular, i.e., as if it was performed by a respondent.

Accordingly, identities or their profiles may be grouped into clusters. The resulting clusters may then each report information that is representative of the individuals' profile data. As long as a variance in the profile data encapsulated within each cluster may be maintained, no one's individual profile may be exposed. Further, according to aspects disclosed in the present disclosure, the level of anonymity of each cluster may be measured-a cluster's information may be measured to determine whether such information has a statistically insignificant likelihood of representing a certain individual. If determined that the information does not represent the individual, his or her privacy is not compromised.

Some embodiments of clusters are atomic ID (AID) clusters, e.g., each including profiles associated with one or more identities. The AID clusters may be formed into a structure based on data received from data source(s). Exemplary data sources may be cookie(s) or advertisement(s) collected through tagging, panelist ID(s), device ID(s), and/or a third-party. Some embodiments may aggregate IDs to form each cluster with an intent of minimizing variance or heterogeneity so that a resulting composite AID may be treated as an "individual" ID, e.g., for upstream processing.

Assignment of the IDs to individual AIDs may be carried out by classifying characteristic data and/or by classifying interaction (e.g., behavioral) data. After forming of the initial cluster, use of more classified characteristic data or classified interaction data may be used to break down the clusters, e.g., by grouping IDs with similar characteristic profiles or similar behavioral profiles. Such classification ensures that specific webpages or websites, which may otherwise be identifying of an individual or group, are not utilized to create overly homogenous groups.

The herein described creation of clusters may be based on AIDs to which are assigned nodes. That is, profile data of a cluster may be represented by individual nodes of a tree or of another suitable structure. For example, profiles comprised in the AID clusters may be associated with device identifiers (but not individuals). In some embodiments, an AID cluster may not be representative of a population.

Some embodiments may support profiles that are not unique. These or other embodiments may, initially, have incomplete AID clusters, e.g., clusters based only on a granular source (e.g., tag(s), third party server log, and panel). The AID clusters with corresponding device profiles may be combined to build a complete profile. Each AID cluster may aggregate identities associated with data having similar attributes or characteristics. The variance of the characteristic data may be reduced so that each AID cluster may be closer to resembling an "individual" identity for upstream processes, such as audience measurement applications. Further clustering of AID clusters based on their identities' characteristic data may refine the AID clusters, and, thereby, may improve their "individual" identity, as described below in reference to FIG. 12.

Figure 12:
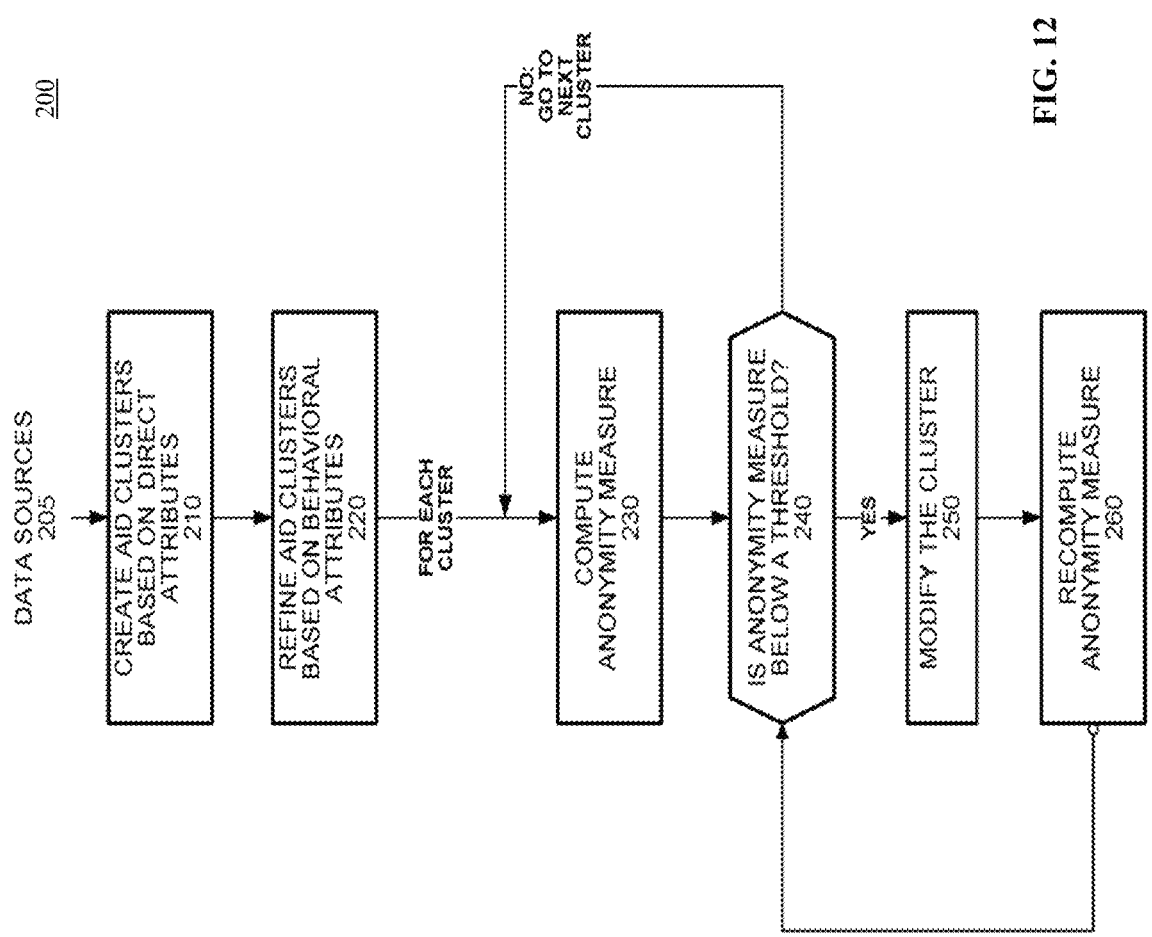
FIG. 12 illustrates a process for generating clustered identities, in accordance with the second embodiment.

FIG. 12 illustrates an example process 200 for generating AID clusters while maintaining a certain anonymity level. At step 205, data is collected from various data sources, such as cookies or advertisements that are obtained through tagging, panelist identifiers, or device identifiers received from a third-party. The collected data may be a plurality of identities, associated profiles, and/or event based data.

At step 210, elements of the collected data may be clustered into AID clusters based on other elements (e.g., direct attributes), so that each cluster encapsulates identities with characteristic data that are similar. Then, at step 220, the AID clusters may be refined by employing further clustering based on more collected data (e.g., interaction/behavioral attributes). Any method known in the art for clustering data may be used to form the AID clusters in steps 210 and 220.

Then, in step 230, the anonymity of each AID cluster may be measured based on entropy. At step 240, if the measured anonymity of a cluster is below a predetermined threshold, the cluster may be modified at step 250. The anonymity of the modified cluster may be measured again at step 260 to confirm that it is now above the predetermined threshold and that no further modifications need be employed. In that manner, process 200 may generate AID clusters at a desired anonymity level that may then be reported without compromising the privacy of their underlying individuals' identities.

More specifically, at step 210, classification may be carried out where features such as directly observed attributes may be used to facilitate the classification of other collected data. Direct attributes may include features such as a country or urban environment, technical data related to the user agent (e.g., browser type, whether the traffic comes from an app, co-occurrence of identifying data and/or of device type, etc.), advertising classification with respect to content, device attributes (e.g., membership in a household through a device graph), and other observable characteristics of users. As such, these features may be deterministically classified. Some embodiments may use these features/attributes to yield large clusters (e.g., on the order of magnitude of thousands or millions of IDs). In some implementations, a number of nodes in the aggregated structure/cluster may be such that not enough is done to minimize a variance of the structure/cluster.

In some embodiments, a number of profiles or identities represented by each AID cluster may be limited to a predetermined minimum, e.g., no less than 100 or 200. A goal in setting this predetermined minimum may be to maximize differentiation of profiles while sufficiently obfuscating individual identities. Due to behavioral classification of IDs and to a required minimum of IDs per cluster, some implementations may have multiple clusters having same or similar deterministic attribute(s) and/or same or similar behavioral profile(s). Some implementations may also have clusters that comprise far more nodes or profiles than the predetermined minimum because a centroid represented may still be a close match for a particular ID.

The AID clusters constructed at step 210 may be very large, possibly containing thousands of identities, thus, having large variance. Hence, at step 220, a refinement of the clustering may be employed wherein classification based on behavioral attributes may further divide the AID clusters constructed at step 210. The behavioral attributes used may be features based on the category of sites accessed and/or the total visitations by category.

Process 200 depicts cluster creation based on direct attributes and then cluster refinement/modification based on behavioral data. However, cluster creation may have been based on behavioral data and then cluster refinement may have been based on direct attributes. Process 200 could also have been drawn without behavioral data. That is, process 200 could have been drawn such that cluster creation was based on a direct attribute and then cluster refinement was based on one or more other direct attributes. Similarly, process 200 could have been drawn without direct attributes. That is, process 200 could have been drawn such that cluster creation was based on a behavioral attribute and then cluster refinement was based on one or more other behavioral attributes.

In some embodiments, behavioral clusters may be broken down along location, device, and household device roster dimensions to align profiles as closely as possible and as a proxy for user demographic alignment, which may not be readily available. Specifically, representative device units (RDUs) may be initially determined to be grouped based on deterministic attributes or elements, such as: (i) location or local market; (ii) OS type; (iii) a number of devices for each platform; and/or (iv) ID tenure bucket. That is, some embodiments may localize and partition cookies or device IDs based on any single attribute or element or on any combination of these deterministic attributes or elements.

Once IDs have been assigned to an RDU or cluster, data across all IDs may be summarized to represent all IDs within the RDU but not to specify any one ID. For example, clusters based on deterministic data at census scale (e.g., advertising categories) may be summarized as a percentage of IDs that fall within the cluster. This transformation into a probabilistic definition further abstracts direct assignment for reporting. In another example, clusters may be built via models to get to census scale, and a probability of each ID being in the cluster is carried into the RDU and averaged. If an ID is not assigned a probability (potentially due to lack of signal for that particular ID), the ID is not included in the average. If more than 50% of the IDs do not have assignment to a cluster, then the RDU will not be assigned a value.

In some embodiments, the clustering (e.g., definition of an RDU) process may be updated on a periodic basis. Further, the update process may focus on updating centroids such that the resulting intra-group variance increases significantly. In some embodiments, incremental IDs not already used in the RDU definition process may, on a daily basis, be assigned to the appropriate RDU and then matched to the nearest behavioral profile for an RDU. This match may persist until the RDU definition is updated.

Having the AID clusters, the identifying attributes encapsulated in these clusters may be protected. For example, behavioral data may be reported to upstream processes, which are typically additive metrics, such as duration of engagement with an asset, pages visited, and/or the number of visits. Non-additive attributes may also be reported using percentages, e.g., of unique visitors. Nevertheless, there still may be AID clusters that may be similar to each other—with the same direct attributes and similar behavioral profiles. Some implementations may involve determination of a cluster with a centroid (e.g., average profile). This determination of a cluster may involve analysis of the centroid, which may be determined based on behavior or interaction of individual(s) using interactive advertising bureau (IAB) subcategories.

The AID clusters may be constructed, in some embodiments, to be aggregates that are incapable of reporting individual device information. Some embodiments may guarantee a level of privacy via performance of additional analysis to ensure that there are still not individual pieces of reportable information in the aggregate, which could identify constituent individuals. For example, a mathematical quantity may be used to allow an analyzer to measure how close a fact comes to revealing an individual's identity uniquely. That quantity is called entropy, and may often be measured in bits. For example, if there are four possibilities, then there are 2 bits of entropy, and by adding one more bit of entropy the number of possibilities doubles. An analyzer may take a relative probability of a person having a particular attribute or behavior and then convert the probability to bits of information. And, when the bits of information are added up, they may provide an estimate for the number of individuals that grouping can represent.

Since AID clusters may be constructed based on aggregations of identities associated with data having similar characteristics, instead of reporting data with identifying attributes, AID clusters may be reported to entities interested in measuring audience behaviors. To further protect privacy, additional analysis may be performed to measure the anonymity of the AID clusters, to ensure that no one data element of an AID cluster may allow for identification of individuals. In an aspect, this may be accomplished by a measurement of entropy.

Entropy measures the uncertainty level of a random variable, and may be defined by exemplary equation 2, below.

$$H(X) = -\Sigma_{x \in X} p(x) \log_2 p(x) \qquad (2)$$

In this equation, X is a discrete random variable with an alphabet X and with a probability function p (x), which may be exemplarily defined by equation 3, below.

$$p(x) = Pr\{X=x\}, x \in X \qquad (3)$$

The log is to the base of 2, thus, entropy is measured in bits. For example, if a certain event X may be associated with household 1 (HH1) with a probability 0.5, with HH2 with a probability 0.25, and with HH3 and HH4 with probabilities 0.125, then the entropy of X is H(X)=1.75 bits. In addition to being a measure of the uncertainty of X, entropy may also be viewed as a measure of the amount of information required on average to describe X. For example, the minimum expected number of binary questions required to identify the household is 1.75: Is X=HH1? If not, is X=HH2? If not, is X=HH3? (or, is X=HH4).

Hence, in an aspect, steps may be taken to measure the amount of information that is required on average to describe an AID cluster. To that end, calculation of the entropies of direct and behavioral attributes may be carried out. The probabilities of those direct attributes and behavioral attributes may be estimated based on consenting panel members, where such panel based probabilities are weighted and balanced to represent the general population.

For example, assuming that an AID cluster encapsulates attributes such as a person's birthday and gender, the anonymity of such a cluster may be measured as follows. The entropy of a random variable of a birthday may be represented by equation 4, below. That is, there is a 1/365 chance of knowing anyone's birthday. This results in collecting:

$$X = \text{Birthday, is } H(\text{Birthday}) = -\log_2\left(\frac{1}{365}\right) = 8.51 \text{ bits} \qquad (4)$$

meaning that 8.51 bits are required on average to represent birthday information. Then, assuming that in the United States the population size is about 315 million people, 29 bits will be required to uniquely represent any one person's identity. If a person's birthday is known, the number of identifying bits is 29−8.51=20.5, still leaving about 20.5 bits of information that are unknown, which is the equivalent of approximately 1.5 million people. Furthermore, if the person's gender is also known, as a gender's representation requires 1 bit (−log₂ (½)) the number of identifying bits is further reduced to 19.5, the equivalent of approximately 750,000 people. Hence, in this example, 19.5 provides a measure of the anonymity of an AID cluster reporting attributes of a person's birthday and gender combined. Source probabilities for digital behavioral events and deterministic attributes will form part of panel data, e.g., where consent to measure such attributes may be acquired and the results may be weighted and balanced to represent the population.

In an aspect, and with respect to each AID cluster, entropies are constructed based on the probabilities of data elements, such as direct attributes and behavioral attributes. Then, as illustrated above, these entropies may be used to measure the level of anonymity. A desirable goal may be securing that each AID cluster has an anonymity level that is no less than that represented by the aggregate identities. For example, assuming between 100 and 500 identities per AID cluster, representable by a bit range of 6 to 9 bits, the allowable information reduction contributed by the cluster's data elements is of 20 to 23 bits. If an AID exceeds the reduction range, certain applicable remedies may include combining AIDs into larger groups to add more variance (and thus less specific information) or, if a specific behavior or attribute is alone too deterministic, removing that attribute/behavior from the reportable set of the AID.

At step 240, if an AID cluster's level of anonymity is below a predetermined threshold, then that cluster's data may be modified at step 250. After modification, the new cluster's level of anonymity may be recomputed at step 260 to confirm that it is above the predetermined threshold. Various methods of modification may be employed to increase the anonymity level of an AID cluster and thereby to insure that no one identity may be identified based on data it may be reporting. For example, two or more AID clusters may be combined, resulting in a larger cluster that increases the cluster variance, and thus the amount of information required to describe it. Alternatively, if a specific attribute of an AID cluster alone is too deterministic, some embodiments may randomize such an attribute or exclude it from the cluster data that may be reported (or may be removed).

In some embodiments, in order to increase the level of anonymity of an AID cluster, the AID cluster may be combined with another AID cluster. For example, one AID cluster may be merged with another AID cluster that is statistically similar to it. According to an aspect, that may be done by computing the mutual information between each pair of clusters. Mutual information is the amount of information that one random variable contains about the other, and it may be exemplarily represented by equation 5, below.

$$I(X, Y) = -\sum_{x \in X} \sum_{y \in Y} p(x, y) \log_2 \frac{p(x, y)}{p(x)p(y)} = \qquad (5)$$
$$H(X) - H(X \mid Y) = H(Y) - H(Y \mid X)$$

Hence, mutual information is the reduction in uncertainty of X as a result of knowledge of Y, and vice versa, the reduction in uncertainty of Y as a result of knowledge of X. For example, if X and Y are independent random variables, then I(X,Y)=0, while if X is a deterministic function of Y, or vice versa, then equation 6 (below) is such that:

$$I(X,Y) = H(X) = H(Y) \qquad (6)$$

As such, being a symmetric and positive function, mutual information may be used as a similarity metric between two random variables, X and Y.

In this example of FIG. 12, the identifiable information may comprise PII each representative of one person via an ID or a name, and, in contrast, both the characteristic data and interaction data may be impersonally identifiable information such that each does not by itself indicate one person. The operations of FIG. 12 may be performed by any of the devices of FIG. 1B, e.g., by data analysis service 135.

General Capabilities and Specification

Electronic storage 22 of FIG. 1A comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a NIC, a display controller, a graphics processing unit (GPU), and/or other resources. In some implementations, some or all of the functionality attributed herein to external resources 24 may be provided by other components or resources included in system 10. Processor 20, external resources 24, user interface device 18, electronic storage 22, a network, and/or other components of system 10 may be configured to communicate with each other via wired and/or wireless connections.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols.

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) googles, virtual reality (VR) googles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. Processor 20 may comprise one or more of a digital processor, an analog processor, a digital circuit designed to process information, an analog circuit designed to process information, a state machine, and/or other mechanisms for electronically processing information. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1A, processor 20 is configured via machine-readable instructions to execute one or more computer program components. The computer program components may comprise one or more of information component 30, training component 32, simulation component 34, matching component 36, personas component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1A as being co-located within a single processing unit, in embodiments in which processor 20 comprises multiple processing units, one or more of components 30, 32, 34, 36, and/or 38 may be located remotely from the other components. For example, in some embodiments, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described.

In some embodiments, processors 20 may be comprised of central processing units (CPUs) 20-1 and/or GPU(s) 20-2. In these or other embodiments, electronic storage 22 may be comprised of RAM 22-1, ROM 22-2, and/or mass storage device 22-3. And external resources 24 may be comprised of network interface controller (NIC) 24-1 and/or input/output (I/O) controller 24-2.

Figure 2:
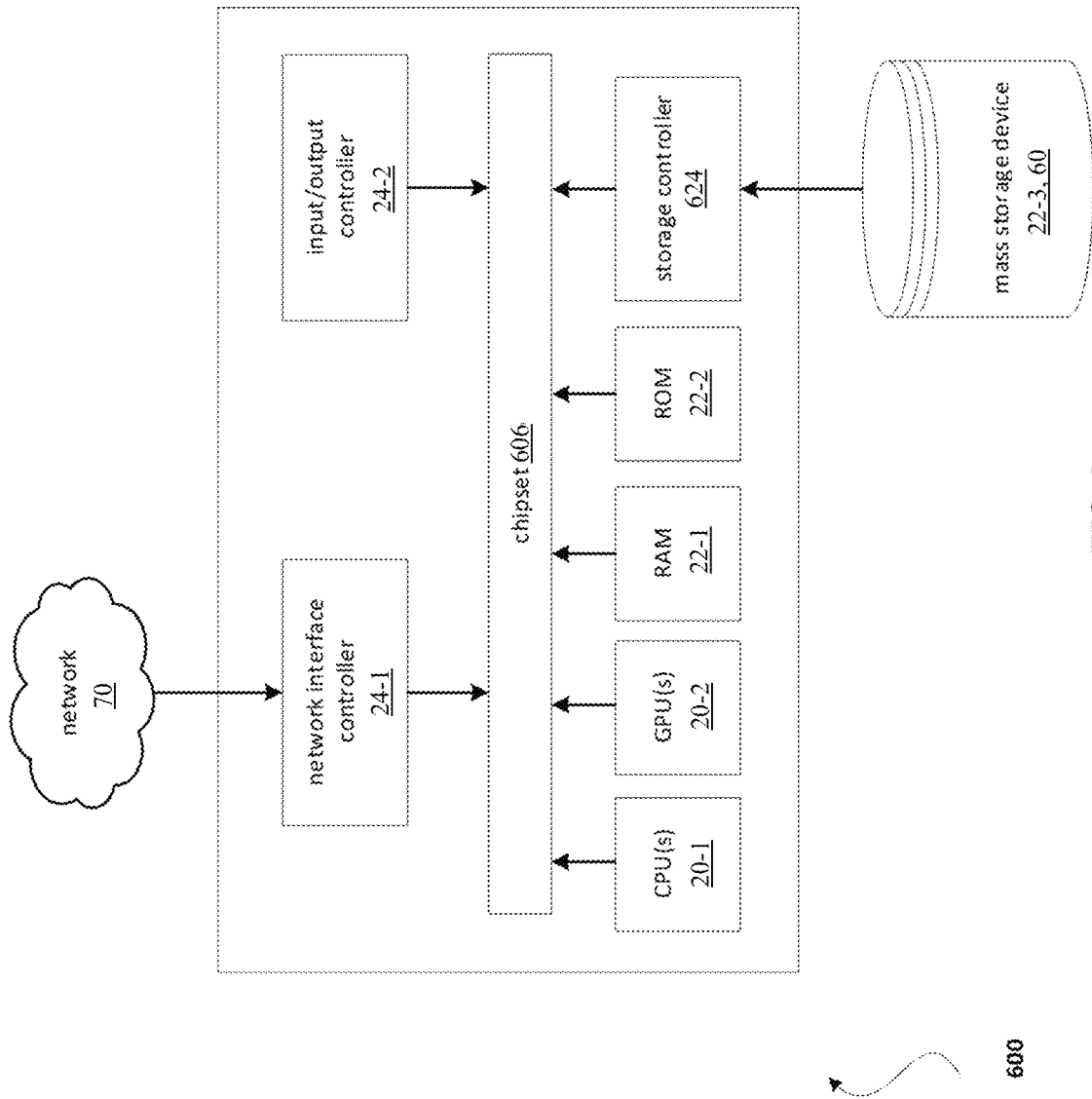
FIG. 2 illustrates an example computing device, in accordance with the first and/or second embodiments.

FIG. 2 depicts a computing device that may be used in various aspects. With regard to the example environment of FIG. 1A, one or more of a content database, panel centric database, site centric database, contextual database, audience database, or a correlation analyzer may be implemented in an instance of a computing device 600 of FIG. 2. The computer architecture shown in FIG. 2 shows a conventional server computer, workstation, desktop computer, laptop, tablet, network appliance, PDA, e-reader, digital cellular phone, or other computing node, and may be utilized to execute any aspects of the processors described herein, such as to implement the methods described in FIGS. 11-13.

Computing device 600 may include a baseboard, or "motherboard," which is a printed circuit board to which a multitude of components or devices may be connected by way of a system bus or other electrical communication paths. One or more CPUs 20-1 may operate in conjunction with a chipset 606. CPU(s) 20-1 may be standard programmable processors that perform arithmetic and logical operations necessary for the operation of computing device 600.

CPU(s) 20-1 may be augmented with or replaced by other processing units, such as GPU(s) 20-2. GPU(s) 20-2 may comprise processing units specialized for but not necessarily limited to highly parallel computations, such as graphics and other visualization-related processing.

A user interface may be provided between CPU(s) 20-1 and the remainder of the components and devices on the baseboard. The interface may be used to access a random access memory (RAM) 22-1 used as the main memory in computing device 600. The interface may be used to access a computer-readable storage medium, such as a read-only memory (ROM) 22-2 or non-volatile RAM (NVRAM) (not shown), for storing basic routines that may help to start up computing device 600 and to transfer information between the various components and devices.

Computing device 600 may operate in a networked environment using logical connections to remote computing nodes and computer systems through network 70. The chipset 606 may include functionality for providing network connectivity through a network interface controller (NIC) 24-1, such as a gigabit Ethernet adapter. NIC 24-1 may be capable of connecting computing device 600 to other computing nodes over network 70. It should be appreciated that multiple NICs 24-1 may be present in computing device 600, connecting the computing device to other types of networks and remote computer systems.

Computing device 600 may be connected to storage devices 22-3, 60 that provides (e.g., non-volatile) storage for the computer. One or more of storage devices 22-3, 60 may store system programs, application programs, other program modules, and data, which have been described in greater detail herein. Storage device 22-3, 60 may be connected to computing device 600 through storage controller 624 connected to chipset 606. Storage devices 22-3, 60 may comprise one or more physical storage units.

Computing device 600 may store information to storage devices 22-3, 60 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Computing device 600 may read information from storage devices 22-3, 60 by detecting the physical states or characteristics of one or more particular locations within the physical storage units.

In addition or alternatively to storage devices 22-3, 60 described herein, computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by computing device 600.

A storage device, such as one or more of storage devices 22-3, 60 depicted in FIG. 2, may store an operating system utilized to control the operation of computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. Storage device 22-3, 60 may store other system or application programs and data utilized by computing device 600.

Storage device 22-3, 60 or other computer-readable storage media may also be encoded with computer-executable instructions, which, when loaded into computing device 600, transforms the computing device from a general-purpose computing system into a special-purpose computer capable of implementing the aspects described herein. These computer-executable instructions transform computing device 600 by specifying how CPU(s) 20-1 transition between states, as described herein. Computing device 600 may have access to computer-readable storage media storing computer-executable instructions, which, when executed by computing device 600, may perform the methods described in relation to FIGS. 11-13.

A computing device, such as computing device 600 depicted in FIG. 2, may also include I/O controller 24-2 for receiving and processing input from a number of input devices, such as a keyboard, a mouse, a touchpad, a touch screen, an electronic stylus, or other type of input device. Similarly, I/O controller 24-2 may provide output to a display, such as a computer monitor, a flat-panel display, a digital projector, a printer, a plotter, or other type of output device. It will be appreciated that computing device 600 may not include all of the components shown in FIG. 2, may include other components that are not explicitly shown in FIG. 2, or may utilize an architecture completely different than that shown in FIG. 2.

As described herein, a computing device may be a physical computing device, such as computing device 600 of FIG. 2. A computing node may also include a virtual machine host process and one or more virtual machine instances. Computer-executable instructions may be executed by the physical hardware of a computing device indirectly through interpretation and/or execution of instructions stored and executed in the context of a virtual machine.

In some implementations, an amount of members of the census network or an amount of the third-party subscribers may be substantially larger an amount of the panelists in the panel.

Several embodiments of the disclosure are specifically illustrated and/or described herein. However, it will be appreciated that modifications and variations of the invention are covered by the above teachings and within the purview of the appended claims without departing from the spirit and intended scope of the invention.

What is claimed is:

1. A method for securing online data privacy, the method comprising:

training a machine learning model using panel data, wherein the panel data comprises measurements of interactions actually performed by panelists during a predetermined time period;

generating a plurality of personas that are initially empty;

receiving census data associated with first online interactions actually performed during the predetermined time period, wherein the census data is different from the panel data used to train the machine learning model;

generating, via the machine learning model for each of the plurality of personas, data associated with second online interactions that simulate Internet traffic, wherein input for the generation of the data associated with the second online interactions comprises event data that is sampled from the census data on a periodic basis, and wherein each of the plurality of personas does not include more than a threshold percentage of events associated with a user associated with the persona;

populating the plurality of personas with the generated data associated with the second online interactions;

selecting a plurality of the received census data associated with the first online interactions that match the generated data associated with the second online interactions for each of the plurality of personas;

replacing the generated data associated with the second online interactions populated in each of the plurality of personas with the selected data; and outputting the plurality of personas with the replaced data.

2. The method of claim 1, wherein none of the received census data is associated with a persistent identifier of a device or a user that performed the first online interactions.

3. The method of claim 1, further comprising:
initiating the generation of data associated with second online interactions for each of the plurality of personas based on one or more random numbers.

4. The method of claim 3, wherein the Internet traffic is simulated for different types of panelists that are individually selected based on at least one of a demographic and device attribute.

5. The method of claim 1, wherein the first online interactions are performed by at least one of a plurality of census network members or a plurality of subscribers to a third party that tracks the subscribers without using trackers.

6. The method of claim 1, wherein each of the first online interactions comprises at least one of a single web browsing interaction, online application interaction, or a media consumption interaction.

7. The method of claim 1, wherein the machine learning model is an adversarial or variational autoencoder.

8. The method of claim 1, further comprising:
arbitrarily generating an identifier for each of the plurality of personas.

9. The method of claim 1, wherein matching the generated data associated with the second online interactions for each of the plurality of personas is behaviorally based on a measure of statistical distance to the received census data associated with the first online interactions.

10. The method of claim 1, wherein matching the generated data associated with the second online interactions for each of the plurality of personas is randomly assigned.

11. The method of claim 10, wherein the matching is performed such that at least a same number of actual events is recorded into each of the plurality of personas.

12. The method of claim 1, further comprising:
clustering the plurality of personas across time or across comparable activity data.

13. The method of claim 1, wherein the machine learning model is trained using the panel data generated by a first set of panelists using a first device characteristic, and wherein a different machine learning model is trained using other panel data generated by a different set of panelists using another device characteristic.

14. The method of claim 1, wherein a sum of the second online interactions equals a sum of the first online interactions.

15. A system comprising:
at least one processor; and
at least one memory storing instructions that, when executed, cause the at least one processor to:
train a machine learning model using panel data, wherein the panel data comprises measurements of interactions actually performed by panelists during a predetermined time period;
generate a plurality of personas that are initially empty;
receive census data associated with first online interactions actually performed during the predetermined time period, wherein the census data is different from the panel data used to train the machine learning model;
generate, via the machine learning model for each of the plurality of personas, data associated with second online interactions that simulate Internet traffic, wherein input for the generation of the data associated with the second online interactions comprises event data that is sampled from the census data on a periodic basis, and wherein each of the plurality of personas does not include more than a threshold percentage of events associated with a user associated with the persona;
populate the plurality of personas with the generated data associated with the second online interactions;
select a plurality of the received census data associated with the first online interactions that match the generated data associated with the second online interactions for each of the plurality of personas;
replace the generated data associated with the second online interactions populated in each of the plurality of personas with the selected data; and
output the plurality of personas with the replaced data.

16. The system of claim 15, further comprising a storage device, wherein a storage space of the storage device is reduced by an extent that satisfies a criterion due to an encoding function of the machine learning model.

17. A non-transitory, computer-readable medium storing instructions that, when executed, cause:
training a machine learning model using panel data, wherein the panel data comprises measurements of interactions actually performed by panelists during a predetermined time period;
generating a plurality of personas that are initially empty;
receiving census data associated with first online interactions actually performed during the predetermined time period, wherein the census data is different from the panel data used to train the machine learning model;
generating, via the machine learning model for each of the plurality of personas, data associated with second online interactions that simulate Internet traffic, wherein input for the generation of the data associated with the second online interactions comprises event data that is sampled from the census data on a periodic basis, and wherein each of the plurality of personas does not include more than a threshold percentage of events associated with a user associated with the persona;

populating the plurality of personas with the generated data associated with the second online interactions;

selecting a plurality of the received census data associated with the first online interactions that match the generated data associated with the second online interactions for each of the plurality of personas;

replacing the generated data associated with the second online interactions populated in each of the plurality of personas with the selected data; and outputting the plurality of personas with the replaced data.

* * * * *